United States Patent
Hirabayashi

(10) Patent No.: US 11,167,415 B2
(45) Date of Patent: Nov. 9, 2021

(54) CONTROL APPARATUS, HORIZONTAL ARTICULATED ROBOT AND ROBOT SYSTEM

(71) Applicant: Seiko Epson Corporation, Tokyo (JP)

(72) Inventor: Tomokazu Hirabayashi, Azumino (JP)

(73) Assignee: Seiko Epson Corporation

( * ) Notice: Subject to any disclaimer, the term of this patent is extended or adjusted under 35 U.S.C. 154(b) by 193 days.

(21) Appl. No.: 16/516,488

(22) Filed: Jul. 19, 2019

(65) Prior Publication Data

US 2020/0023515 A1    Jan. 23, 2020

(30) Foreign Application Priority Data

Jul. 20, 2018 (JP) .............................. JP2018-137027

(51) Int. Cl.
| | |
|---|---|
| *B25J 13/08* | (2006.01) |
| *B25J 9/16* | (2006.01) |
| *B25J 9/06* | (2006.01) |

(52) U.S. Cl.
CPC .............. *B25J 9/1641* (2013.01); *B25J 9/06* (2013.01); *B25J 9/1694* (2013.01); *B25J 13/088* (2013.01)

(58) Field of Classification Search
CPC .... B25J 9/042–044; B25J 9/06; B25J 9/1641; B25J 9/1694–1697; B25J 13/088–089; B25J 19/02–04; G05B 2219/37388; G05B 2219/41193; G05B 2219/41195; G05B 2219/41205; G05B 2219/42077
See application file for complete search history.

(56) References Cited

U.S. PATENT DOCUMENTS

| | | | |
|---|---|---|---|
| 8,831,781 B2 | 9/2014 | Igarashi et al. | |
| 2005/0246061 A1* | 11/2005 | Oaki | B25J 9/1692 700/245 |
| 2012/0179294 A1* | 7/2012 | Sasai | B25J 9/1694 700/254 |
| 2012/0215357 A1* | 8/2012 | Igarashi | B25J 9/1694 700/258 |
| 2012/0296471 A1* | 11/2012 | Inaba | B25J 9/163 700/253 |

FOREIGN PATENT DOCUMENTS

| | | |
|---|---|---|
| JP | 2012-171052 A | 9/2012 |
| JP | 2017-056542 A | 3/2017 |
| JP | 2017-056543 A | 3/2017 |
| JP | 2017-056544 A | 3/2017 |

* cited by examiner

*Primary Examiner* — Dale Moyer
(74) *Attorney, Agent, or Firm* — Harness, Dickey & Pierce, P.L.C.

(57) ABSTRACT

A control apparatus controls a horizontal articulated robot including a base, a first arm provided at the base and pivoting around a first axis relative to the base, a second arm provided at the first arm and pivoting around a second axis relative to the first arm, a shaft provided in the second arm and linearly moving in directions along a third axis, a motor that drives linear motion of the shaft, a position detector that detects a position of the motor, and an inertial sensor provided in the second arm, and includes a control section that feeds back output of the inertial sensor to control of the motor and drives the motor.

16 Claims, 15 Drawing Sheets

CONTROL APPARATUS, HORIZONTAL ARTICULATED ROBOT AND ROBOT SYSTEM

The present application is based on, and claims priority from, JP Application Serial Number 2018-137027, filed Jul. 20, 2018, the disclosure of which is hereby incorporated by reference herein in its entirety.

BACKGROUND

1. Technical Field

The present disclosure relates to a control apparatus, horizontal articulated robot and robot system.

2. Related Art

A control apparatus that reduces vibration using an inertial sensor attached to a horizontal articulated robot for which a position and a posture within a horizontal plane and a position in a vertical direction may be controlled.

For example, a horizontal articulated robot disclosed in JP-A-2012-171052 includes a base, a first arm pivotably provided around a first axis as a rotation center relative to the base, a second arm pivotably provided around a second axis as a rotation center relative to the first arm, a shaft that linearly moves relative to the second arm, and an inertial sensor provided in the second arm, for which a technique of feeding back output of the inertial sensor to a motor that drives the first arm and reducing vibration in the pivot direction of the arm disclosed.

JP-A-2012-171052 is an example of the related art.

However, in the technique disclosed in JP-A-2012-171052, reduction of vibration in axial directions of the shaft in the distal end portion of the shaft is not considered. In this case, natural damping of the vibration takes time, and there are problems of decrease in work capacity due to waiting for convergence of vibration and degradation in work quality due to working before convergence of vibration.

SUMMARY

An aspect of the present disclosure is directed to a control apparatus that controls a horizontal articulated robot including a base, a first arm provided at the base and pivoting around a first axis relative to the base, a second arm provided at the first arm and pivoting around a second axis relative to the first arm, a shaft provided in the second arm and linearly moving in directions along a third axis, a motor that drives linear motion of the shaft, a position detector that detects a position of the motor, and an inertial sensor provided in the second arm, includes a control section that feeds back output of the inertial sensor to control of the motor and drives the motor.

Another aspect of the present disclosure is directed to a horizontal articulated robot controlled by the control apparatus.

Another aspect of the present disclosure is directed to a robot system including the control apparatus and a horizontal articulated robot controlled by the control apparatus.

DESCRIPTION OF EXEMPLARY EMBODIMENTS

A control apparatus, horizontal articulated robot and robot system will be explained in detail based on embodiments.

First Embodiment

Figure 1:
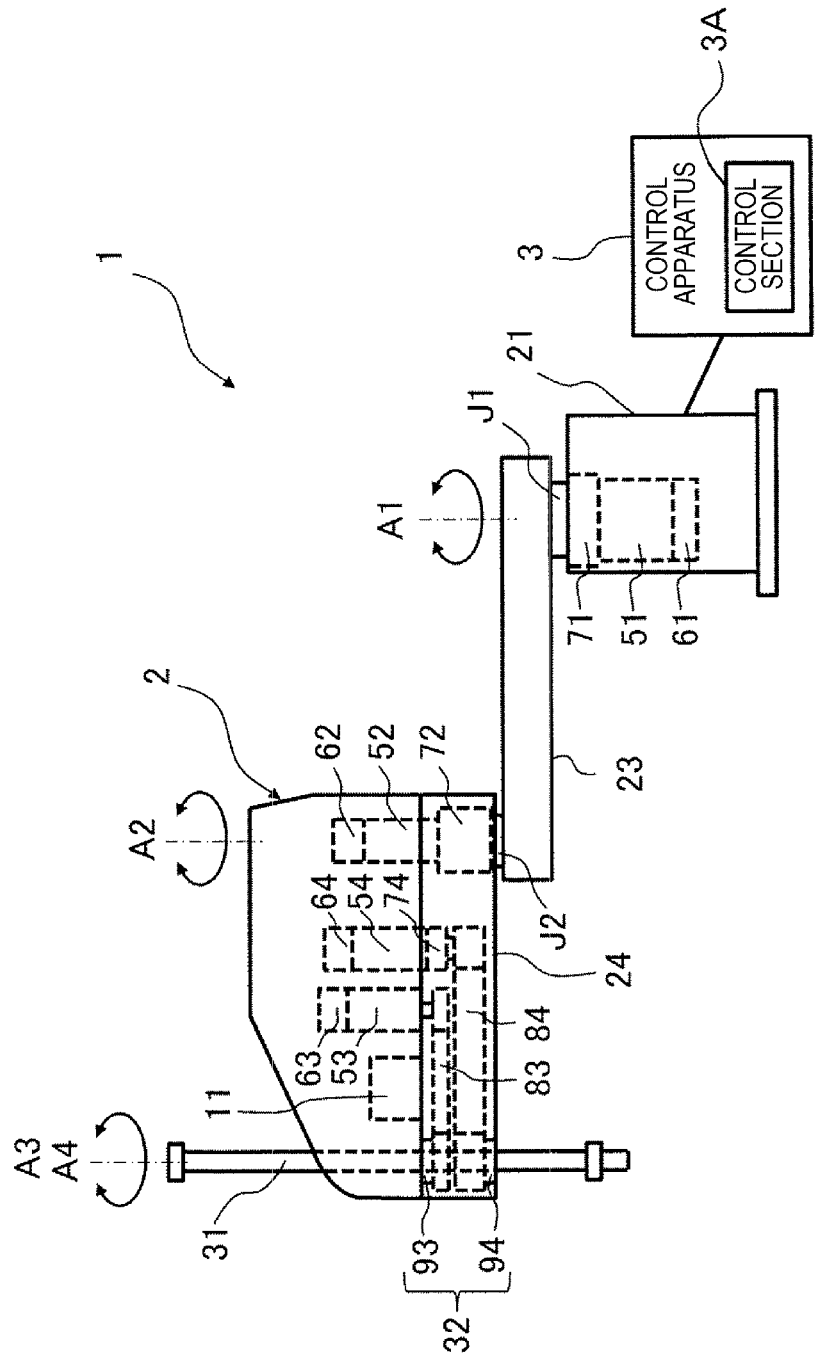
FIG. 1 shows an overall configuration of a robot system according to a first embodiment.
Figure 2:
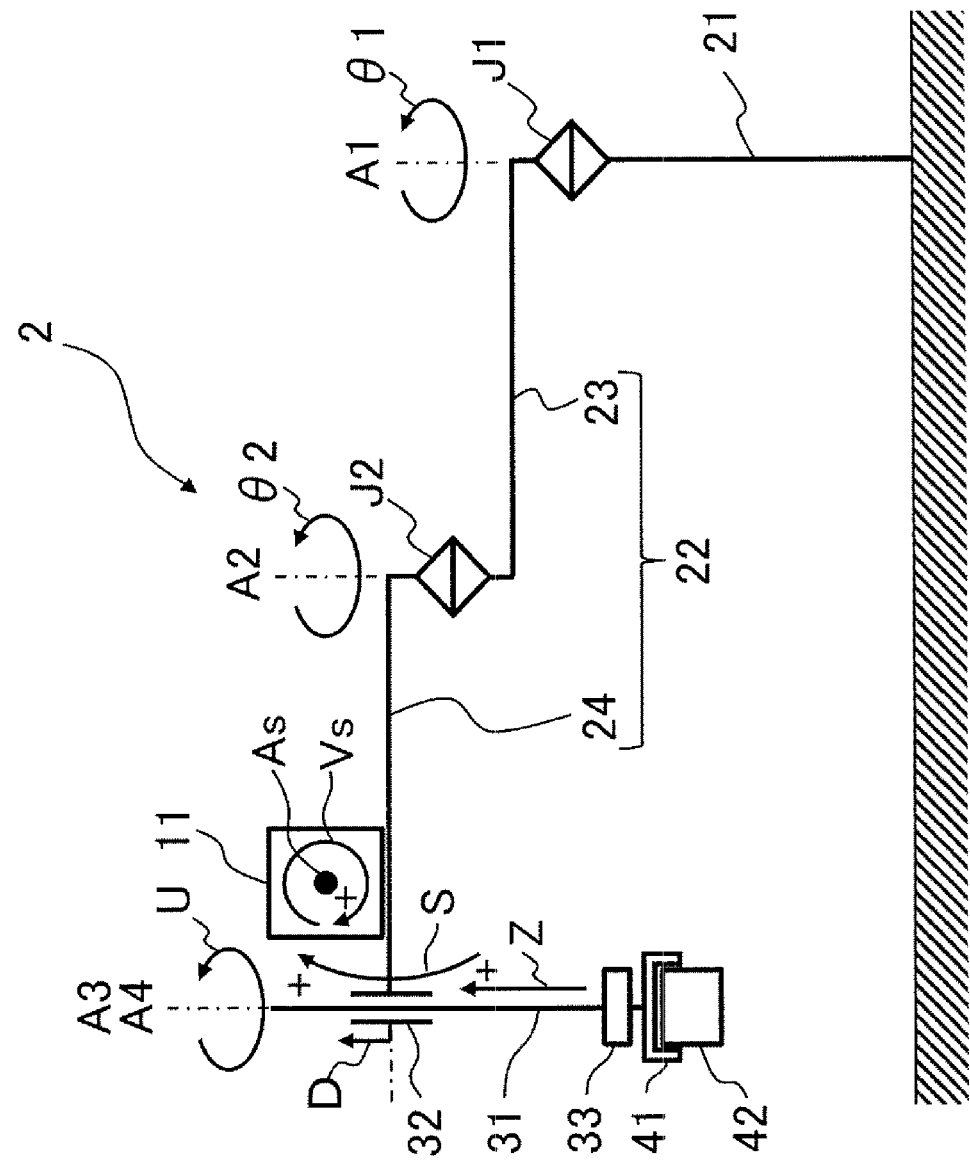
FIG. 2 shows a configuration of a robot according to the first embodiment.
Figure 3:
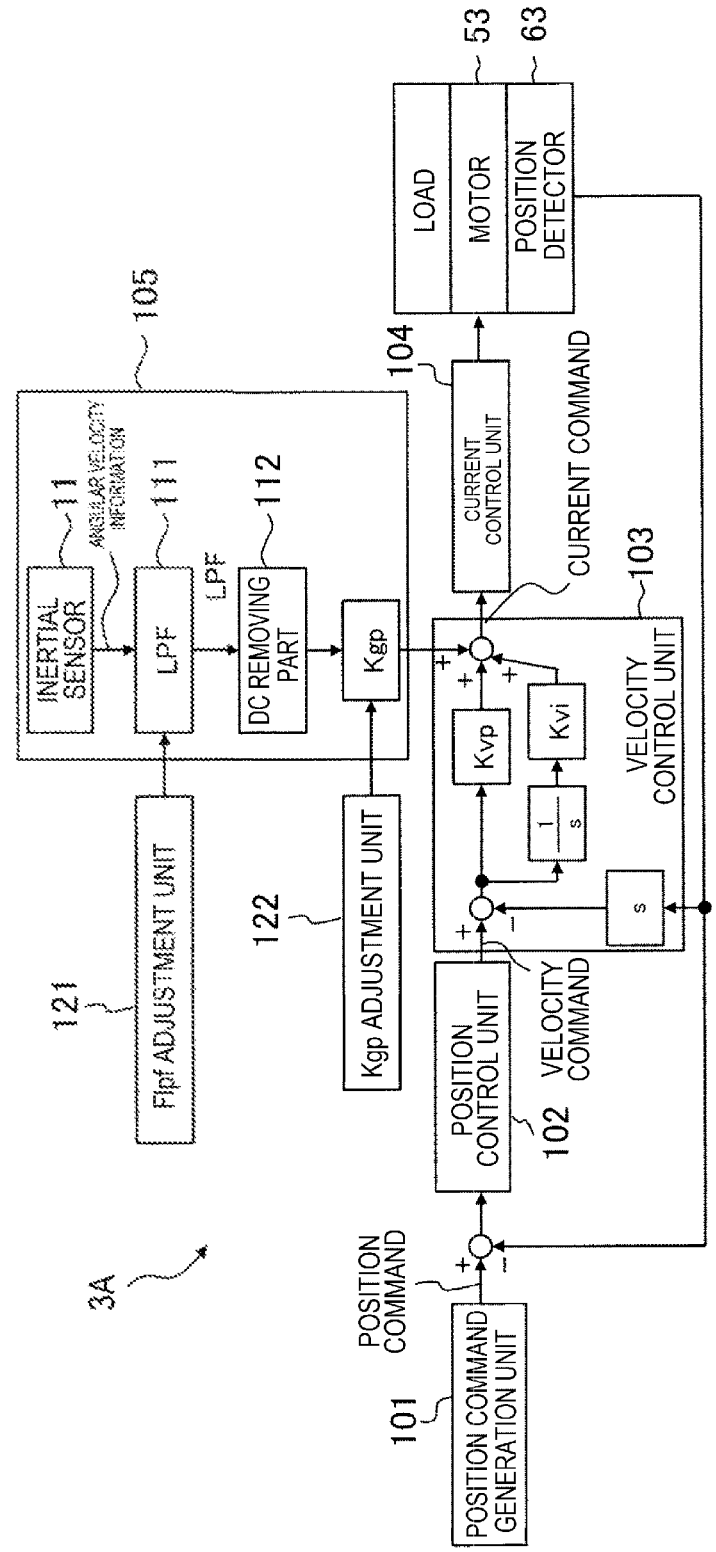
FIG. 3 is a control block diagram in which inertial sensor information is processed in an inertial sensor information processing unit A and fed back to a current command according to the first embodiment.
Figure 4:
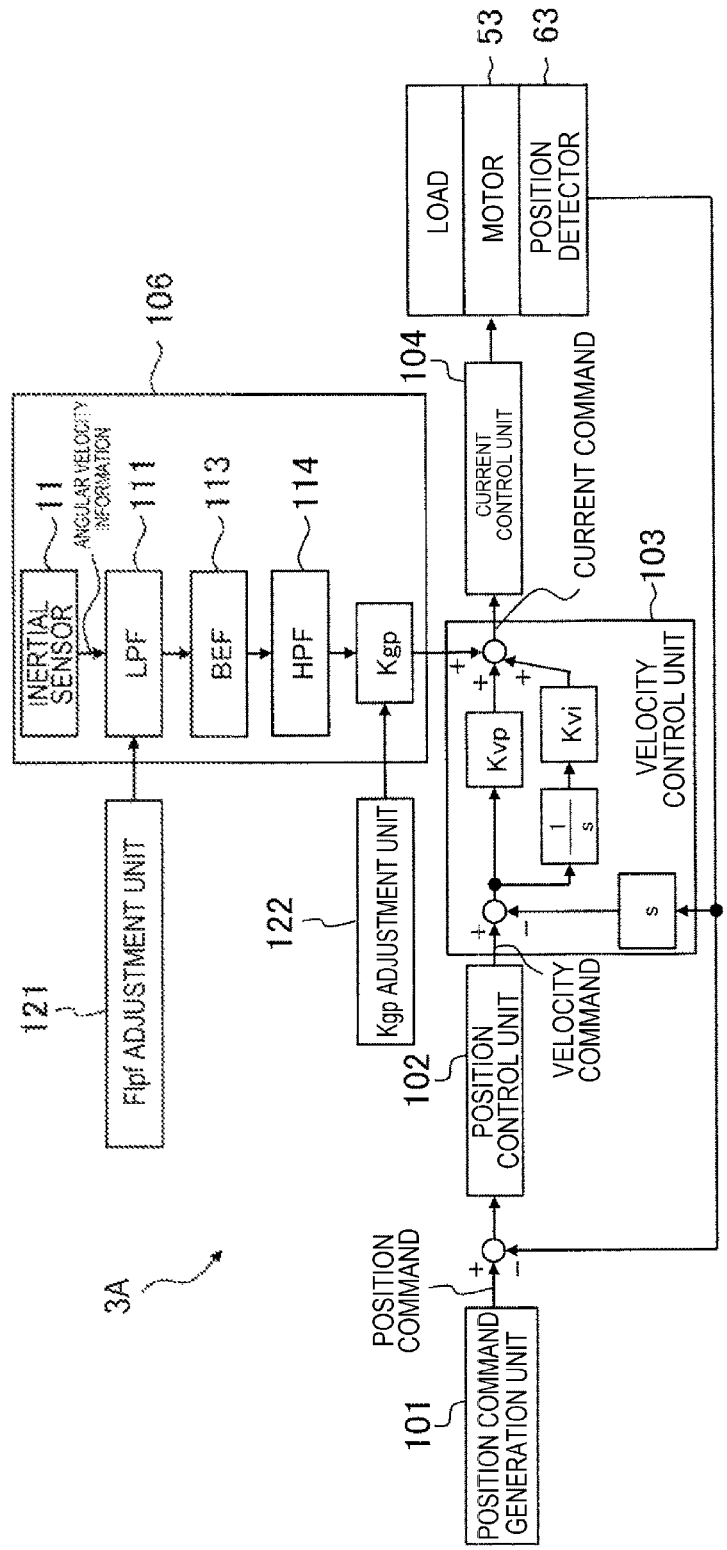
FIG. 4 is a control block diagram in which the inertial sensor information is processed in an inertial sensor information processing unit B and fed back to the current command according to the first embodiment.
Figure 8:
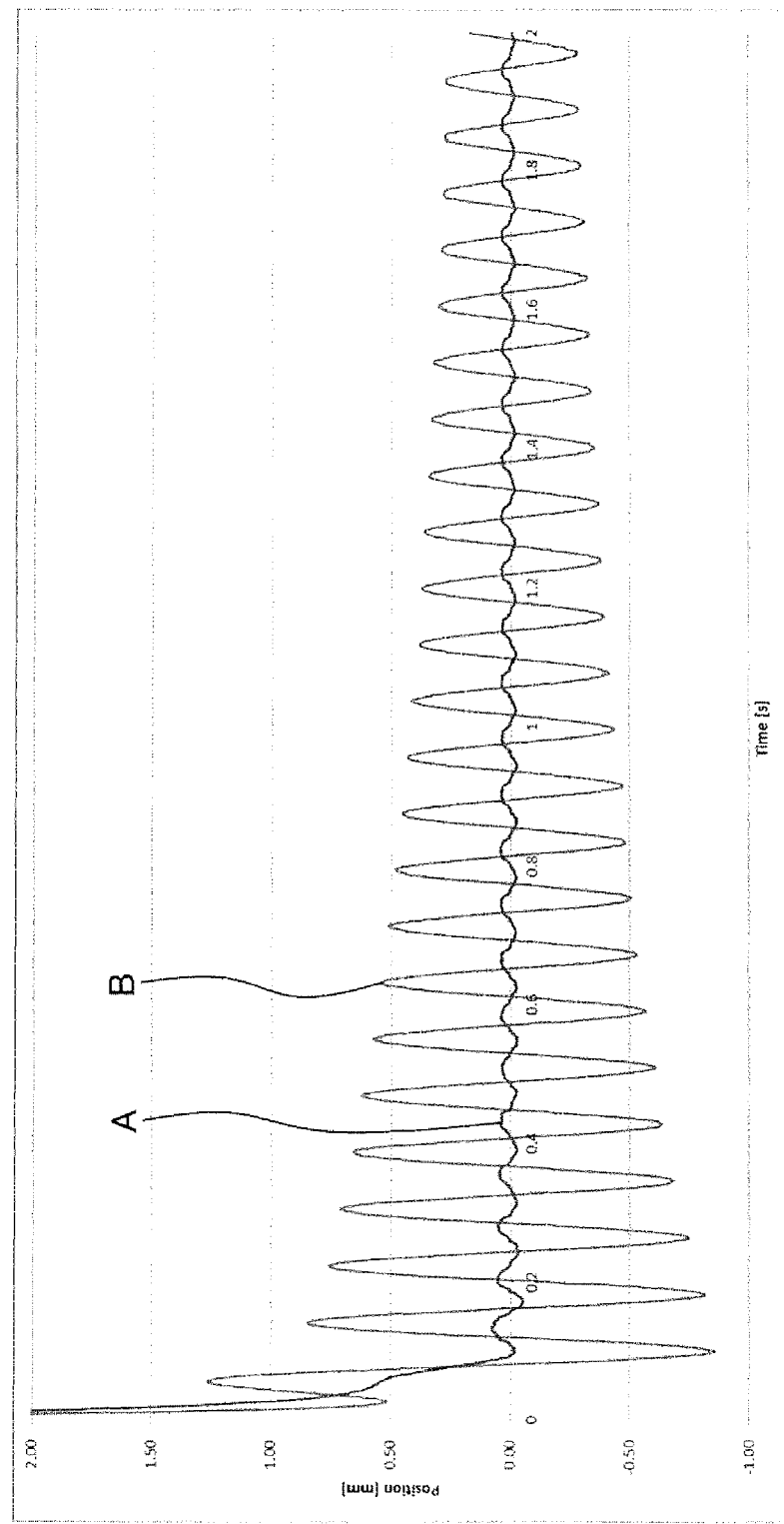
FIG. 8 is a graph showing a vibration reduction effect of a control apparatus according to the first embodiment.

FIG. 1 shows the overall configuration of the robot system according to the first embodiment of the present disclosure. FIG. 2 shows the configuration of the robot shown in FIG. 1. FIGS. 3 and 4 are the control block diagrams of feedback of inertial sensor information to the current command for the control apparatus shown in FIG. 1. FIG. 8 is a graph showing an effect of reducing vibration of the control apparatus shown in FIG. 1.

A robot system 1 shown in FIG. 1 includes a robot 2 and a control apparatus 3 that controls the robot 2. The usage of the robot system 1 is not limited, but the robot may be used for work of e.g. carrying, assembly, inspection, etc. of electronic components.

The robot 2 is a horizontal articulated robot, and includes a base 21, a first arm 23 pivotably provided around a first axis A1 as a rotation center relative to the base 21, a second arm 24 pivotably provided around a second axis A2 as a rotation center relative to the first arm 23, a shaft 31 provided linearly movably in directions along a third axis A3 and pivotably around a fourth axis A4 as a rotation center relative to the second arm 24, and an inertial sensor 11 provided in the second arm 24 and detecting an angular velocity about an angular velocity detection axis As orthogonal to a plane formed by the second axis A2 and the third axis A3 as a rotation axis.

The base 21 is fixed to an installation surface (not shown) of the robot using bolts or the like. The first arm 23 is pivotally driven by a first motor 51 via a reducer 71 and pivots around the first axis A1 as the pivot center. A first position detector 61 is provided at the first motor 51 and detects a position of the pivot of the first arm 23.

The second arm 24 is pivotally driven by a second motor 52 via a reducer 72 and pivots around the second axis A2 as the pivot center. A second position detector 62 is provided at the second motor 52 and detects a position of the pivot of the second arm 24.

In the embodiment, the shaft 31 uses a ball screw spline that enables linear motion and pivot, and an outer ring of a ball screw nut 93 and an outer ring of a spline outer cylinder 94 are secured to the second arm 24 to form a shaft supporting part 32. The ball screw nut 93 is pivotally driven by a third motor 53 via a first timing belt 83, and the shaft 31 linearly moves in directions along the third axis A3. A third position detector 63 is provided at the third motor 53 and detects a position of linear motion of the shaft 31.

The spline outer cylinder 94 is pivotally driven by a fourth motor 54 via a second timing belt 84, and the shaft 31 pivots around the fourth axis A4 as the pivot center. A fourth position detector 64 is provided at the fourth motor 54 and detects an angle of pivot of the shaft 31.

Note that, in the embodiment, the ball screw spline with the third axis A3 and the fourth axis A4 coaxially provided is used, however, a mechanism with the third axis A3 and the fourth axis A4 not coaxially provided may be used. Further, in the embodiment, the shaft 31 is provided in the second arm 24, however, it is only necessary that the shaft 31 is provided in an arm 22 including the first arm 23 and the second arm 24. For example, when the arm 22 includes a third arm provided in the second arm 24, the shaft 31 may be provided in the third arm.

It is preferable that the inertial sensor 11 is placed in the second arm 24 near the shaft supporting part 32. Further, in the embodiment, the inertial sensor 11 is provided in the second arm 24, however, it is only necessary that the inertial sensor 11 is provided in the arm 22 including the first arm 23 and the second arm 24. For example, when the arm 22 includes a third arm provided in the second arm 24, the inertial sensor 11 may be provided in the third arm.

In the embodiment, the inertial sensor 11 is an angular velocity sensor and, as shown in FIG. 2, placed to detect the angular velocity Vs about the angular velocity detection axis As orthogonal to the plane containing the second axis A2 and the third axis A3.

The first arm 23 is cantilevered by a first joint J1 relative to the base 21 and the second arm 24 is cantilevered by a second joint J2 relative to the first arm 23, and thereby, the shaft supporting part 32 is, as shown in FIG. 2, displaced in a direction of S containing a rotation component by flexural deformation of the first joint J1 and the second joint J2 and bending and torsional deformation of the first arm 23 and the second arm 24. The S direction has a component of rotational motion, and the inertial sensor 11 may detect a change in an amount of displacement D of the shaft supporting part 32 as the angular velocity Vs about the angular velocity detection axis As.

The control apparatus 3 has a control section 3A electrically coupled to the robot 2 and controlling the robot 2. The robot 2 and the control apparatus are electrically coupled by a cable. Further, a part or all of the control apparatus 3 may be provided in the robot 2.

Figure 15:
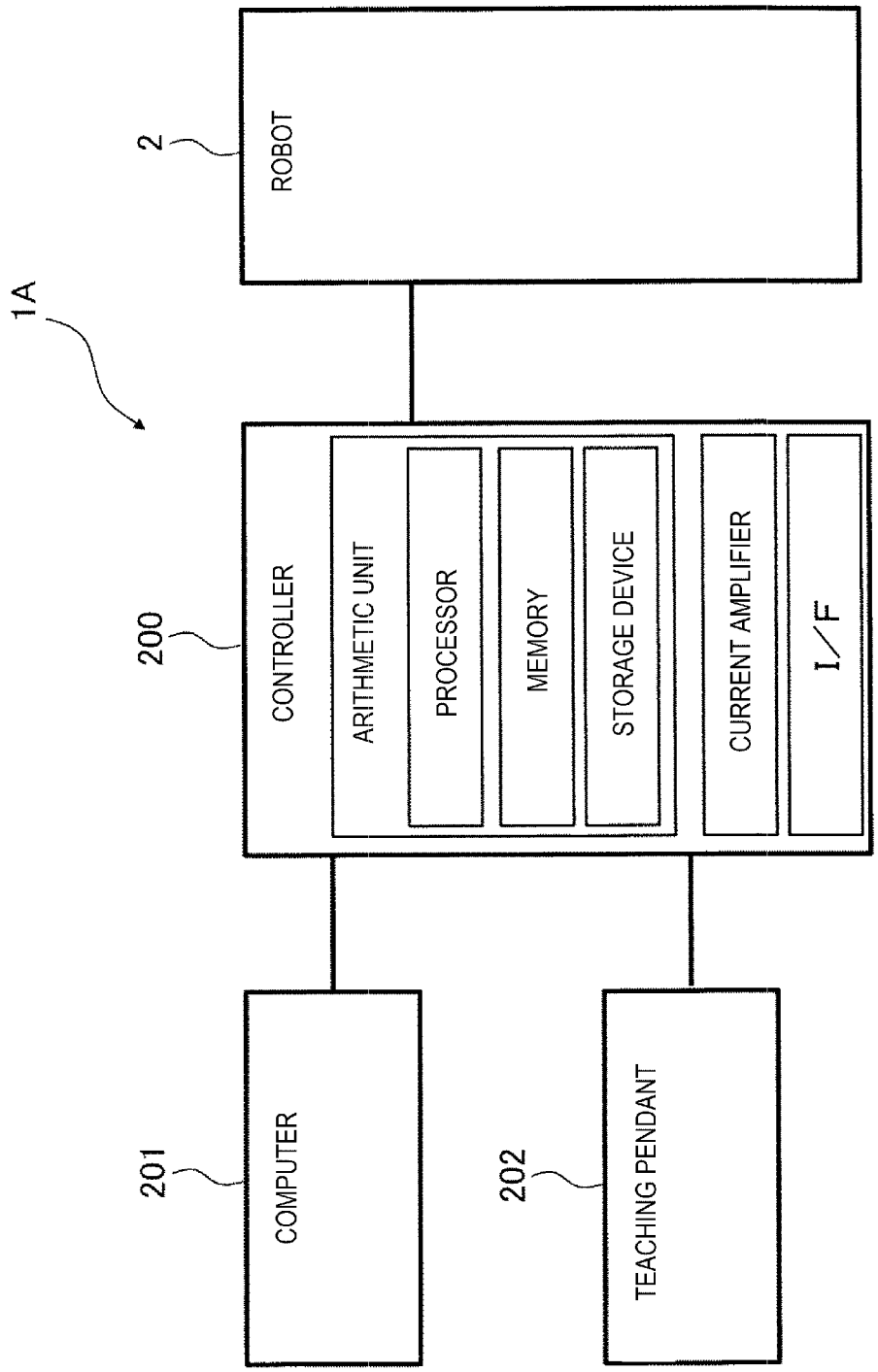
FIG. 15 is a block diagram showing a state in which a controller is connected to the robot, a computer, and a teaching pendant.

The control apparatus 3 has a controller 200 including an arithmetic unit formed using a processor such as a microprocessor that processes calculations for controlling the robot, a memory, and a storage device, a current amplifier that controls currents for driving motors, and an interface (I/F) for exchanging information with peripheral devices. Further, a computer 201 used as a man-machine interface and a teaching pendant 202 for teaching the robot can be connected to the control apparatus 3 (see FIG. 15).

Note that the processor may include a plurality of processors. For example, the processors may be provided not only in the controller 200 but also indifferent locations than the controller 200 (e.g. the computer 201, the teaching pendant 202, a server used in a cloud service provided via a network environment such as LAN, etc.), and the control apparatus 3 can be realized using part or all of these processors.

The control section 3A of the control apparatus 3 controls the first motor 51, the second motor 52, the third motor 53, and the fourth motor 54 using the processor based on position information of the first position detector 61, the second position detector 62, the third position detector 63, and the fourth position detector 64. Further, the control section 3A feeds back the angular velocity detected by the inertial sensor 11 to the control of the third motor 53 and reduces vibration of the shaft supporting part 32 in the vertical directions.

As shown in FIG. 2, a hand attachment flange 33 is provided at the lower end of the shaft 31. A hand 41 is attached to the hand attachment flange 33. The hand 41 grips a work 42 and the robot 2 performs work of carrying and assembly.

In the robot 2 having the above described configuration, when the linear motion of the shaft 31 is accelerated or decelerated or an external force in the vertical direction acts on the shaft 31, the shaft supporting part 32 vibrates in the vertical directions. The vibration of the shaft supporting part 32 in the vertical directions takes a longer damping time.

Next, a control method of feeding back the angular velocity information detected by the inertial sensor 11 to a current command and reducing the vibration of the shaft supporting part 32 will be explained using the control block diagrams in FIGS. 3 and 4. There are two types of filtering processing methods of the angular velocity information: a method using an inertial sensor information processing unit A in FIG. 3 and a method using an inertial sensor information processing unit B in FIG. 4.

The control section 3A in FIG. 3 includes a position command generation unit 101, a position control unit 102, a velocity control unit 103, a current control unit 104, and an inertial sensor information processing unit A 105 that performs filtering processing on the angular velocity information detected by the inertial sensor 11 and feeds back the information to the current command for control of the third motor 53 that linearly moves the shaft 31.

The position command generation unit 101 generates a position command of the third motor 53 that linearly moves the shaft 31 with respect to each control cycle. The position control unit 102 generates a velocity command to make the position command generated by the position command generation unit 101 coincide with the position of the third motor 53 detected by the third position detector 63. The velocity control unit 103 is configured to perform proportional integral control as an example and generates a current command to make a velocity obtained form the position detected by the third position detector coincide with the velocity command. The current control unit 104 controls a current for driving the third motor 53 to make the current coincide with the current command.

The inertial sensor information processing unit A 105 includes the inertial sensor 11, an LPF (lowpass filter) 111, a DC removing part 112, and a feedback gain Kgp multiplication processing part.

An angular velocity sensor is used as the inertial sensor 11 in the embodiment, and detects the vibration of the shaft supporting part 32 in the vertical directions as a change in angular velocity.

The LPF 111 removes sensor noise in a high-frequency range contained in the angular velocity information detected by the inertial sensor 11, mechanical resonance, and detuning noise output by the inertial sensor 11. It is preferable that the cutoff frequency of the LPF 111 is set from 20 Hz to 200 Hz so that noise that destabilizes control may be removed at a higher damping rate without degradation of quality of angular velocity information in a low-frequency range necessary for the detection of the vibration of the shaft supporting part 32.

The DC removing part 112 removes an offset component contained in the angular velocity information. In the embodiment, the offset component is detected as a moving average of the angular velocity information when the robot 2 stops. A method of removing the offset component using the moving average of the angular velocity information has higher performance in reduction of the vibration in the vertical directions compared to a method using an HPF (highpass filter) because only the direct-current component contained in the angular velocity information is removed and the quality of the angular velocity information in the low-frequency range used for reduction of vibration is not degraded. Further, the processing is relatively simple and increase of calculation processing of the control section 3A may be prevented.

The feedback gain Kgp multiplication processing part generates input to the current command by filtering processing of the angular velocity information detected by the inertial sensor 11 and multiplication by angular velocity feedback gain Kgp.

The control method configured as above is applied to the control to drive the third motor, and thereby, the vibration of the shaft supporting part 32 may be reduced.

Next, a function of reducing the vibration of the shaft supporting part 32 will be explained using the control method described in FIG. 3. A reaction force for linear motion of the shaft 31 acts on the shaft supporting part 32. The present disclosure reduces the vibration of the shaft supporting part 32 using the reaction force. As described in FIG. 2, the position Z of the shaft 31, the angular velocity Vs detected by the inertial sensor 11, and the direction of the amount of displacement D of the shaft supporting part 32 are defined. As described in FIG. 3, when the output of the inertial sensor information processing unit A 105 is added to the current command, the acceleration of the shaft 31 is adjusted to damp the angular velocity of the shaft supporting part 32, and thereby, the vibration of the shaft supporting part 32 is reduced. According to the control method, the vibration of the shaft supporting part 32 is reduced by adjustment of the current command for driving the shaft 31, and thus, the vibration of the shaft supporting part 32 is reduced while the shaft 31 is moved.

According to the control method described in FIG. 3, the angular velocity information is fed back to the current command and the reaction force that suppresses the vibration of the shaft supporting part 32 in the vertical directions is directly controlled, and thereby, control with faster response and higher vibration suppression performance may be realized. Further, the vibration of the shaft supporting part 32 is reduced while the shaft 31 is moved. Furthermore, the DC removing part 112 removes only the direct-current component contained in the angular velocity information and no distortion is generated in the angular velocity information in the low-frequency range, and no delay of positioning occurs. Even when the direct-current component is left in the output of the DC removing part 112, the component is cancelled as a disturbance by the integral control of the velocity control unit, and no shift is produced in the position of the shaft 31.

The graph described in FIG. 8 shows records of changes of the vibration in the vertical directions when the work 42 is positioned in a case A with damping control and a case B without damping control. According to the control apparatus 3, the vibration is further reduced in the case A with control compared to the case B without control to reduce the vertical vibration.

Next, the control method using the inertial sensor information processing unit B described in FIG. 4 will be explained. The control section 3A described in FIG. 4 includes the position command generation unit 101, the position control unit 102, the velocity control unit 103, and the current control unit 104 like those in FIG. 3, and an inertial sensor information processing unit B 106 different from that in FIG. 3. The inertial sensor information processing unit B 106 includes the inertial sensor 11, the LPF (lowpass filter) 111, a BEF (band elimination filter) 113, an HPF (Highpass filter) 114, and the feedback gain Kgp multiplication processing part.

An angular velocity sensor is used as the inertial sensor 11 in the embodiment, and detects the vibration of the shaft supporting part 32 in the vertical directions as a change in angular velocity and outputs the angular velocity information.

The LPF 111 removes sensor noise in a high-frequency range contained in the angular velocity information detected by the inertial sensor 11 and mechanical resonance. It is preferable that the cutoff frequency of the LPF 111 is set from 20 Hz to 200 Hz so that sensor noise in the high-frequency range and mechanical resonance that destabilize sound production and control may be removed at a higher damping rate without degradation of quality of angular velocity information in a low-frequency range necessary for the detection of the vibration of the shaft supporting part 32 in the vertical directions.

The BEF 113 removes detuning noise output by the inertial sensor 11. The detuning noise has a different frequency depending on the type of the inertial sensor 11, and a band for removal of the detuning noise may be set according to the property of the inertial sensor 11 for use.

The HPF 114 removes an offset component contained in the angular velocity information. An appropriate cutoff frequency is set, and thereby, the HPF may completely remove offset that changes with time. It is preferable that the cutoff frequency of the HFP is set to 20 Hz or lower.

The feedback gain Kgp multiplication processing part generates input to the current command by multiplication of angular velocity information obtained by removal of the noise in the low-frequency range and the DC component from the angular velocity information detected by the inertial sensor 11 by angular velocity feedback gain Kgp.

According to the inertial sensor information processing unit B 106 described in FIG. 4, the detuning noise may be removed according to the property of the inertial sensor 11 using the BEF 113, and thereby, inertial sensors having various properties may be used. Further, the HPF 114 may completely remove the direct-current component contained in the angular velocity information, and thereby, the inertial sensor 11 having offset that largely varies may be used.

Note that, in the embodiment, the example using the angular velocity sensor as the inertial sensor 11 is shown, however, velocity information obtained by integration of an acceleration detected by an acceleration sensor may be used.

As above, in the robot system 1, the embodiment of the control apparatus 3 in which the control section 3A uses the control method of feeding back the angular velocity information detected by the inertial sensor 11 to the current command is explained. According to the embodiment, the following advantages may be obtained.

A control apparatus according to an embodiment of the present disclosure is a control apparatus that controls a horizontal articulated robot including a base, a first arm provided at the base and pivoting around a first axis relative to the base, a second arm provided at the first arm and pivoting around a second axis relative to the first arm, a shaft provided in the second arm linearly moving in directions along a third axis, a motor that drives linear motion of the shaft, a position detector that detects a position of the motor, and an inertial sensor provided in the second arm, and includes a control section that feeds back output of the inertial sensor to control of the motor and drives the motor.

In related art, it is necessary to increase moment rigidity of a bearing supporting an arm and increase bending and torsional rigidity of the arm not to generate vibration of a shaft supporting part in vertical directions. Recently, to improve work capacity of a robot, weight capacity of the robot has been increased and working speed of the robot has been improved. However, to increase the above described rigidity of the mechanical elements of the robot, there are problems of increase in shape size and weight of the robot and cost increase.

According to the embodiment, the vibration of the shaft supporting part generated due to slant of the supporting parts of the first arm and the second arm and bending and torsion of the first arm and the second arm of the horizontal articulated robot may be reduced. The vibration of the lower end portion of the shaft in the vertical directions generated due to deformation of the supporting parts of the arms and the arms takes time to be naturally damped, and problems of the horizontal articulated robot of related art including decrease in work capacity due to waiting for convergence of vibration, damage on a working object due to working before convergence of vibration, degradation in work quality due to variations in work position, increase in shape size and weight of the robot, and cost increase may be solved.

According to the embodiment, increase in acceleration for linear motion of the shaft for speeding up of the robot, mass increase of works for expanding work to be performed, enhancement of the vibration of the shaft supporting part due to extension of the arms for expanding the coverage of work may be suppressed and the work capacity of the robot may be improved.

The control section according to an embodiment of the present disclosure has a position command generation unit that generates a position command, a position control unit that generates a velocity command based on the position command, a velocity control unit that generates a current command based on the velocity command, and a current control unit that controls a current for driving the motor, and feeds back output of the inertial sensor to the current command.

According to the embodiment, the output of the inertial sensor is fed back to the current command of the control to drive the motor for linearly moving the shaft, and thus, response is faster, vibration suppression performance is higher, no position shift is produced even when offset is contained in the output of the inertial sensor, and the vibration of the shaft supporting part in the vertical directions may be reduced.

The control section according to an embodiment of the present disclosure removes noise contained in the output of the inertial sensor using a lowpass filter.

According to the embodiment, mechanical resonance in a high-frequency range that destabilizes control and detuning noise contained in the output of the inertial sensor may be removed, and thus, control to reduce the vibration of the shaft supporting part in the vertical directions may be realized with less influence by individual differences and environment changes.

The lowpass filter according to an embodiment of the present disclosure has a cutoff frequency from 20 Hz to 200 Hz.

According to the embodiment, noise that destabilizes control is removed without degradation of quality of information in a low-frequency range necessary for suppression of the vibration of the shaft supporting part in the vertical directions, and thereby, control with higher effect of suppression of the vibration of the shaft supporting part in the vertical directions may be realized.

The control section according to an embodiment of the present disclosure removes detuning noise contained in the output of the inertial sensor using a band elimination filter.

According to the embodiment, the detuning noise contained in the output of the inertial sensor, which is hard to be removed by the lowpass filter, is removed according to the property of the inertial sensor, and thereby, the vibration of the shaft supporting part in the vertical directions may be suppressed using inertial sensors having various properties for detuning noise.

The control section according to an embodiment of the present disclosure obtains an offset component contained in the output of the inertial sensor by moving average and removes the offset component from the output of the inertial sensor.

According to the embodiment, offset contained in the inertial sensor is obtained by moving average that may be realized by a simple calculation and the offset is cancelled. Therefore, positioning is not delayed because information in a low-frequency range of the output of the inertial sensor necessary for vibration suppression is not distorted and increase in an amount of calculation of control processing is suppressed, and thereby, the vibration of the shaft supporting part in the vertical directions may be suppressed.

The control section according to an embodiment of the present disclosure removes an offset component contained in the output of the inertial sensor using a highpass filter.

According to the embodiment, offset contained in the inertial sensor may be completely removed by the highpass filter, and thus, the vibration of the shaft supporting part in the vertical directions may be suppressed using the inertial sensor 11 having offset that largely varies.

The inertial sensor according to an embodiment of the present disclosure is an angular velocity sensor that detects an angular velocity about an angular velocity detection axis orthogonal to a plane containing the second axis and the third axis.

According to the embodiment, the angular velocity sensor is placed to detect the angular velocity about the angular velocity detection axis orthogonal to the plane containing the second axis and the third axis, and thereby, an angular velocity equal to the vibration of the shaft supporting part in the vertical directions may be detected with higher sensitivity.

The horizontal articulated robot according to an embodiment of the present disclosure is a horizontal articulated robot controlled by the control apparatus.

According to the embodiment, the horizontal articulated robot that suppresses the vibration of the shaft supporting part in the vertical directions may be realized.

A robot system according to an embodiment of the present disclosure includes the control apparatus and a horizontal articulated robot controlled by the control apparatus.

According to the embodiment, the robot system including the horizontal articulated robot that suppresses the vibration of the shaft supporting part in the vertical directions and the control apparatus may be realized.

Second Embodiment

Figure 5:
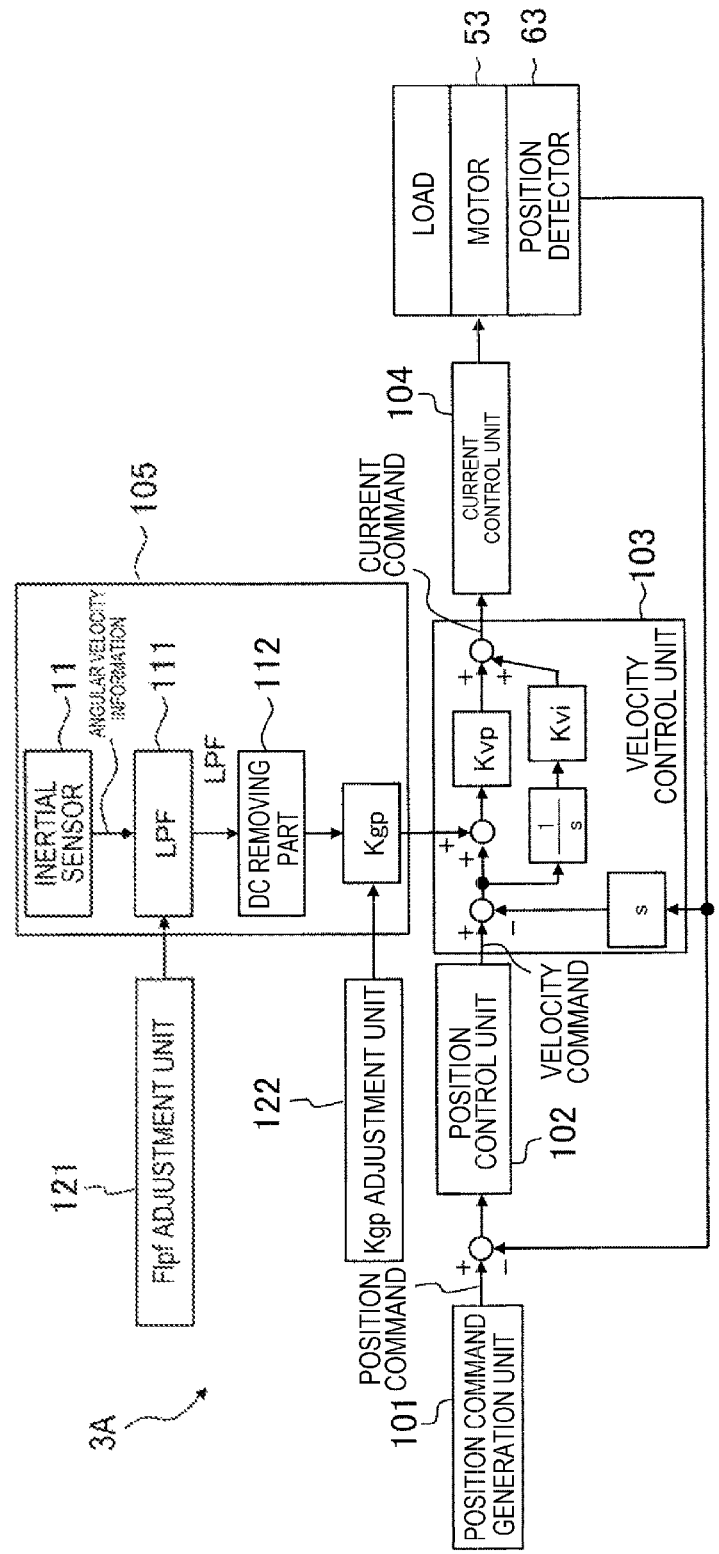
FIG. 5 is a control block diagram in which the inertial sensor information is processed in the inertial sensor information processing unit A and fed back to proportional control of a velocity control unit according to a second embodiment.
Figure 6:
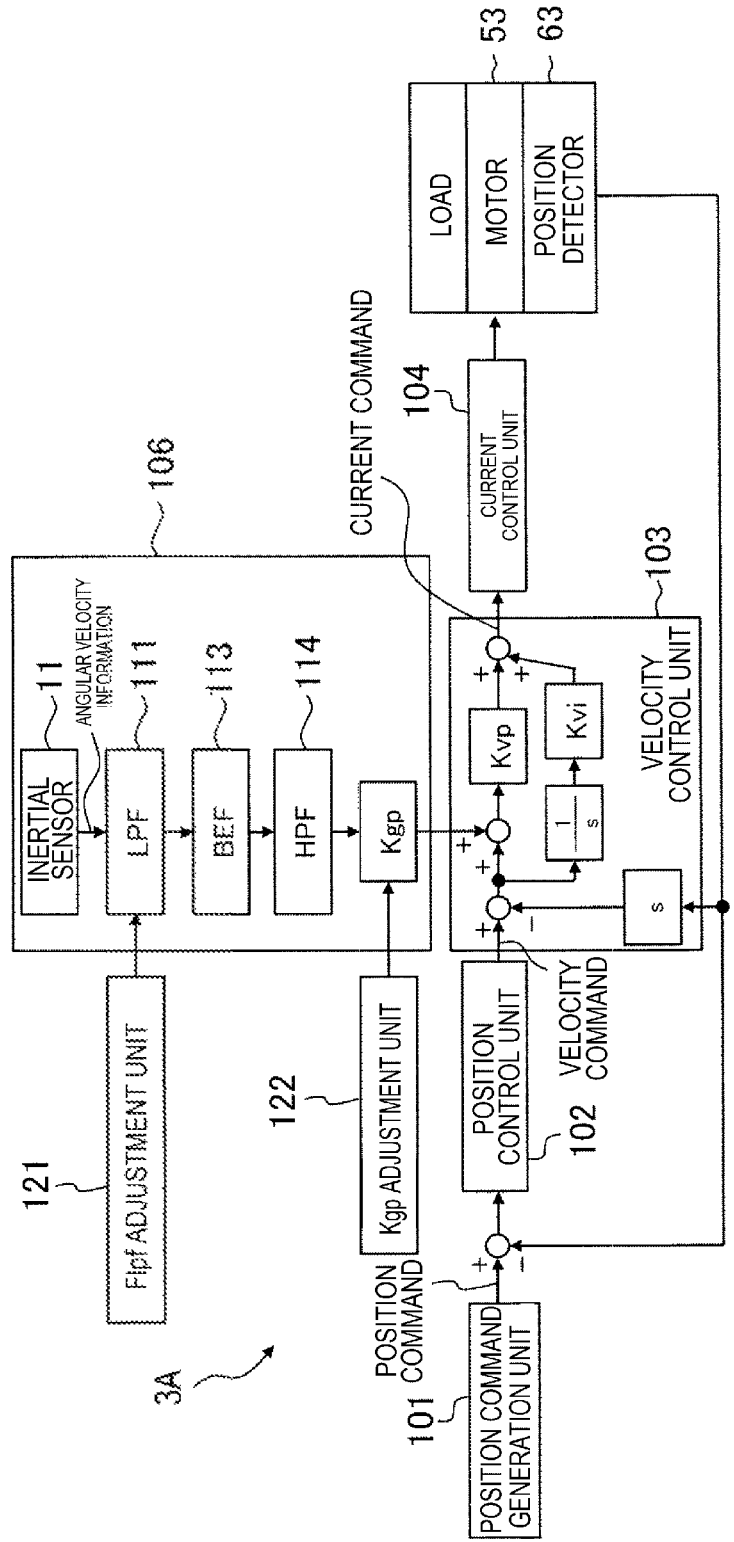
FIG. 6 is a control block diagram in which the inertial sensor information is processed in the inertial sensor information processing unit B and fed back to the proportional control of the velocity control unit according to the second embodiment.

FIGS. 5 and 6 are the control block diagrams for feeding back inertial sensor information to proportional control of the velocity control unit of the control apparatus shown in FIG. 1 according to the second embodiment of the present disclosure.

The robot system 1 according to the embodiment is the same as the robot system 1 according to the above described first embodiment except that the control method of the control section 3A of the control apparatus 3 is different. Note that, in the following description, the robot system 1 of the second embodiment will be explained with a focus on differences from the above described first embodiment and the explanation of the same items will be omitted.

Next, a control method of reducing the vibration of the shaft supporting part 32 by feeding back the angular velocity information detected by the inertial sensor 11 to proportional control of the velocity control unit will be explained using the control block diagrams in FIGS. 5 and 6. There are two types of filtering processing methods of the angular velocity information: a method using an inertial sensor information processing unit A in FIG. 5 and a method using an inertial sensor information processing unit B in FIG. 6.

The control section 3A in FIG. 5 includes a position command generation unit 101, a position control unit 102, a velocity control unit 103, a current control unit 104, and an inertial sensor information processing unit A 105 that performs filtering processing on the angular velocity information detected by the inertial sensor 11 and feeds back the information to the proportional control of the velocity control unit for control of the third motor 53 for linearly moving the shaft 31.

The inertial sensor information processing unit A 105 includes the inertial sensor 11, an LPF (lowpass filter) 111, a DC removing part 112, and a feedback gain Kgp multiplication processing part.

An angular velocity sensor is used as the inertial sensor 11 in the embodiment, and detects the vibration of the shaft supporting part 32 in the vertical directions as a change in angular velocity.

The control method configured as above is applied to the control to drive the third motor, and thereby, the vibration of the shaft supporting part 32 in the vertical directions may be reduced.

Next, a function of reducing the vibration of the shaft supporting part in the vertical directions by the control method described in FIG. 5 will be explained using FIG. 2.

When the shaft supporting part 32 is displaced at a velocity in a positive direction relative to the coordinate of the amount of displacement D in an upward direction in FIG. 2, the inertial sensor 11 detects the angular velocity Vs in the positive direction. In the control method described in FIG. 5, filtering processing is performed on the angular velocity Vs using LPF and in the DC removing unit, then, the angular velocity is multiplied by angular velocity feedback gain Kgp and added to the proportional control of the velocity control unit, and thereby, a velocity command to increase the velocity of the third motor 53 in the positive direction is generated. Accordingly, when the shaft 31 is accelerated in the positive direction of the Z coordinate described in FIG. 2, a reaction force in D negative direction acts on the shaft supporting part 32 and displacement of the shaft supporting part 32 in the D positive direction is suppressed.

The reaction force driving the shaft 31 acts on the shaft supporting part 32, and thereby, the angular velocity of the shaft supporting part 32 is damped and the vibration of the shaft supporting part 32 may be reduced.

Further, the reaction force is processed together with the control to drive the shaft 31 to correspond to the position command, and the vibration of the shaft supporting part 32 may be reduced at the same time with the position control of the shaft 31.

According to the control method described in FIG. 5, the angular velocity information is fed back to the proportional control of the velocity control unit and the reaction force for suppressing the vibration of the shaft supporting part 32 in the vertical directions is obtained by changing the velocity command, and thereby, highly stable control robust to environment changes and disturbances may be realized. Further, the vibration of the shaft supporting part 32 may be reduced while the position of the shaft 31 is controlled. The DC removing part 112 removes only the offset component contained in the angular velocity information and the quality of the angular velocity information in the low-frequency range necessary for the reduction of the vibration of the shaft supporting part 32 is not degraded, and thus, control with higher vibration suppression effect may be realized. Further, even when the offset component is left in the angular velocity information output from the DC removing part 112, the component is cancelled as a disturbance by the integral control of the velocity control unit, and no shift is produced in the position of the shaft 31.

Next, in the second embodiment of the present disclosure, an embodiment using the inertial sensor information processing unit B will be explained.

FIG. 6 is characterized by filtering processing of the inertial sensor information in the inertial sensor information processing unit B including the LPF 111, the BEF 113, the HPF 114, and the feedback gain Kgp multiplication processing part.

An angular velocity sensor is used as the inertial sensor 11 in the embodiment, and detects the vibration of the shaft supporting part 32 in the vertical directions as a change in angular velocity and outputs the angular velocity information.

The control method configured as above is applied to the control to drive the third motor, and thereby, the vibration of the shaft supporting part 32 in the vertical directions may be reduced.

A function of reducing the vibration of the shaft supporting part 32 in the vertical directions according to the control method described in FIG. 6 is the same as the control method using the inertial sensor information processing unit A, and the explanation thereof is omitted.

According to the inertial sensor information processing unit B 106 described in FIG. 6, the detuning noise may be removed according to the property of the inertial sensor 11 using the BEF 113, and thereby, inertial sensors having various properties may be used. Further, the temporarily fluctuating offset component contained in the angular velocity information may be removed using the HPF 114, and thereby, the inertial sensor 11 having offset that largely varies may be used.

Note that, in the embodiment, the example using the angular velocity sensor as the inertial sensor 11 is shown, however, velocity information obtained by integration of an acceleration detected by an acceleration sensor may be used.

As above, in the robot system 1, the embodiment of the control apparatus 3 characterized in that the control section 3A uses the control method of feeding back the angular velocity information detected by the inertial sensor 11 to the proportional control of the velocity control unit is explained. According to the embodiment, the following advantages may be obtained.

The control section according to an embodiment of the present disclosure has a position command generation unit that generates a position command, a position control unit that generates a velocity command based on the position command, a velocity control unit that generates a current command based on the velocity command, and a current control unit that controls a current for driving the motor, and feeds back output of the inertial sensor to proportional control of the velocity control unit.

According to the embodiment, the output of the inertial sensor is fed back to the proportional control of the velocity control unit of the control to drive the motor for linearly moving the shaft, and thus, an influence by environment changes is less, no position shift is produced even when offset is contained in the output of the inertial sensor, and the vibration of the shaft supporting part in the vertical directions may be reduced.

Third Embodiment

Figure 7:
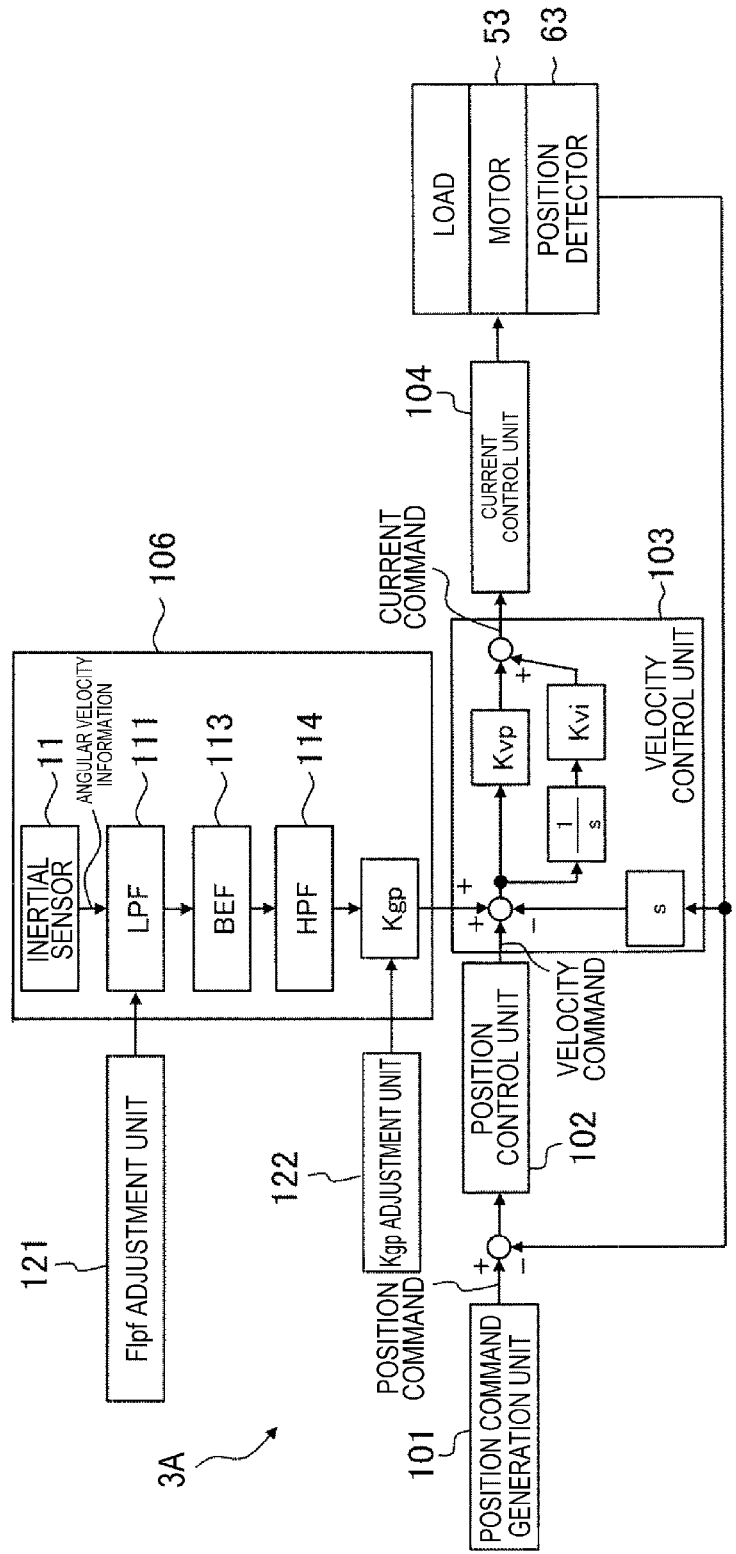
FIG. 7 is a control block diagram in which inertial sensor information is processed in the inertial sensor information processing unit B and fed back to a velocity command according to a third embodiment.

FIG. 7 is the control block diagram for feeding back inertial sensor information to the velocity command in the control apparatus 3 shown in FIG. 1 according to the third embodiment of the present disclosure.

The robot system 1 according to the embodiment is the same as the robot system 1 according to the above described first embodiment except that the control method of the control section 3A of the control apparatus 3 is different. Note that, in the following description, the robot system 1 of the third embodiment will be explained with a focus on differences from the above described first embodiment and the explanation of the same items will be omitted.

A control method of the control section 3A of the control apparatus 3 of reducing the vibration of the shaft supporting part 32 in the vertical directions by feeding back the inertial sensor information detected by the inertial sensor 11 to the velocity command will be explained based on the control block diagram in FIG. 7.

The control section 3A in FIG. 7 includes a position command generation unit 101, a position control unit 102, a velocity control unit 103, a current control unit 104, and an inertial sensor information processing unit B 106 that performs filtering processing on the angular velocity information detected by the inertial sensor 11 and feeds back the information to the velocity command for control of the third motor 53 for linearly moving the shaft 31.

The present disclosure is characterized by feeding back filtering-processed angular velocity information to the velocity command in the inertial sensor information processing unit B including the LPF 111, the BEF 113, HPF 114, and the feedback gain Kgp multiplication processing part.

An angular velocity sensor is used as the inertial sensor 11 in the embodiment, and detects the vibration of the shaft supporting part 32 in the vertical directions as a change in angular velocity and outputs the angular velocity information.

The control method configured as above is applied to the control to drive the third motor, and thereby, the vibration of the shaft supporting part 32 in the vertical directions may be reduced.

A function of reducing the vibration of the shaft supporting part in the vertical directions according to the control method described in FIG. 7 is the same as the control method of the second embodiment, and the explanation thereof is omitted.

According to the inertial sensor information processing unit B 106 described in FIG. 7, the detuning noise may be removed according to the property of the inertial sensor 11 using the BEF 113, and thereby, stability of the control may be enhanced. Further, the temporarily fluctuating offset component contained in the angular velocity information may be completely removed using the HPF 114, and thereby, the inertial sensor 11 having offset that largely varies may be used.

Note that, in the embodiment, the example using the angular velocity sensor as the inertial sensor 11 is shown, however, velocity information obtained by integration of an acceleration detected by an acceleration sensor may be used.

As above, in the robot system 1, the embodiment of the control apparatus 3 characterized in that the control section 3A uses the control method of feeding back the angular velocity detected by the inertial sensor 11 to the velocity command is explained. According to the embodiment, the following advantages may be obtained.

The control section according to an embodiment of the present disclosure has a position command generation unit that generates a position command, a position control unit that generates a velocity command based on the position command, a velocity control unit that generates a current command based on the velocity command, and a current control unit that controls a current for driving the motor, and feeds back output of the inertial sensor to the velocity command.

According to the embodiment, the output of the inertial sensor is fed back to the velocity command of the control to drive the motor for linearly moving the shaft, and thus, an

Fourth Embodiment

The control apparatus 3 according to the fourth embodiment of the present disclosure adjusts angular velocity feedback gain Kgp based on an angle θ2 of the second arm 24.

The control apparatus 3 of the robot system 1 described in FIG. 1 according to the embodiment has a function of improving the effect of reducing the vibration of the shaft supporting part 32 in the vertical directions and stabilizing control. Note that, in the following description, the embodiment will be explained with a focus on differences from the first embodiment to third embodiment and the explanation of the same items will be omitted.

In the robot system 1 according to the embodiment, as shown in FIGS. 3 to 7, the control section 3A has a Kgp adjustment unit 122 that changes the angular velocity feedback gain Kgp based on the angle θ2 of the second arm 24 relative to the first arm 23. When the angle θ2 changes, rigidity of the shaft supporting part 32 in the vertical directions relative to the base 21 and inertia about the shaft supporting part 32 in a combination of the first arm 23 and the second arm 24 change. Specifically, when the second arm bends and the angle θ2 increases, the rigidity becomes lower and the inertia decreases. Accordingly, if the angular velocity feedback gain Kgp is fixed regardless of the angle θ2, the control may be destabilized and the damping effect may be insufficient. The control apparatus 3 of the embodiment is configured to adjust the angular velocity feedback gain Kgp according to the angle θ2 and solves the above described problem.

Figure 9:
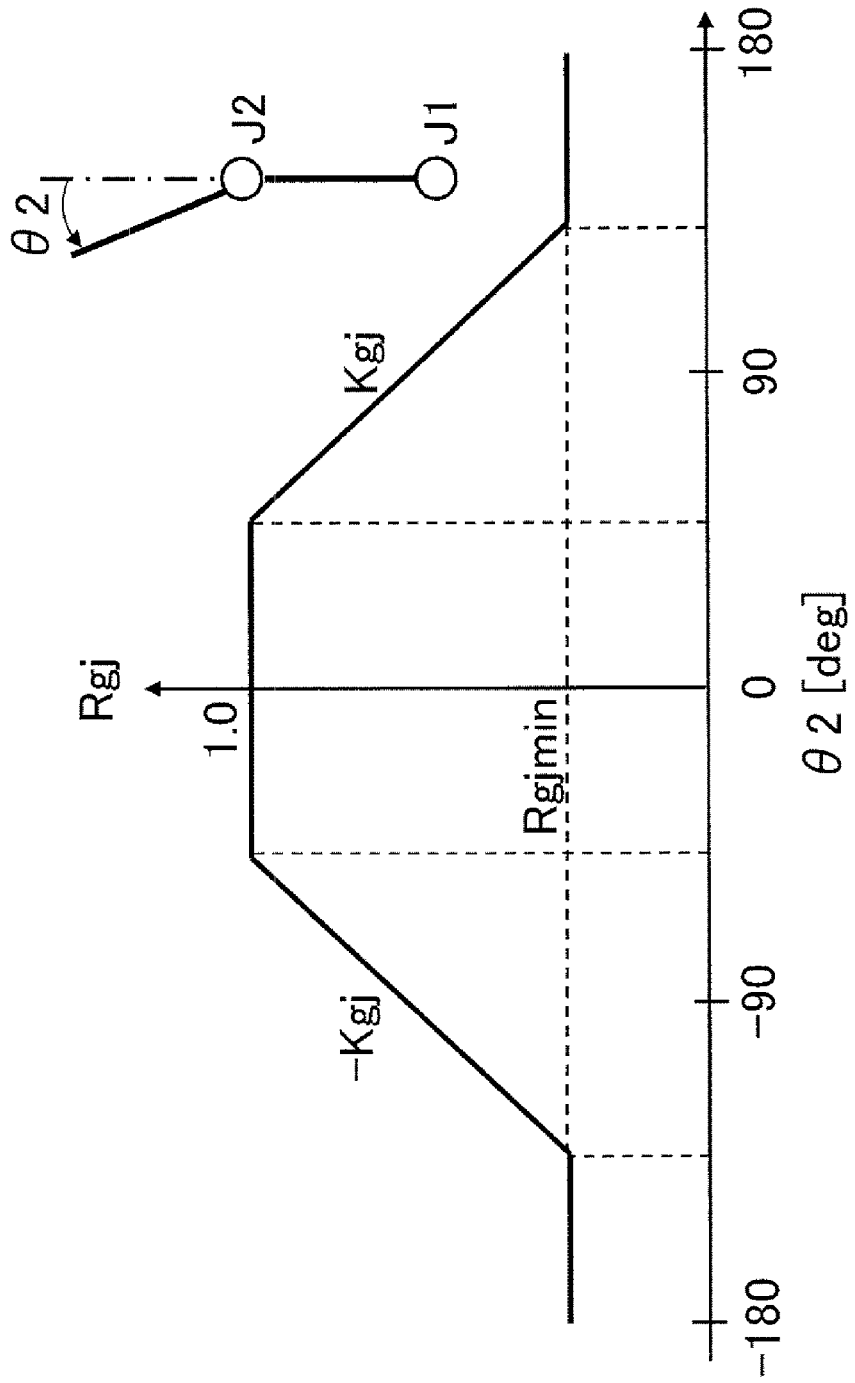
FIG. 9 is a graph showing a relationship between an angle θ2 of a second arm and a coefficient Rgj according to a fourth embodiment.

As an example of the control method, FIG. 9 shows a graph of a relationship between the angle θ2 of the second arm and a coefficient Rgj. The vertical axis of the graph in FIG. 9 indicates the coefficient Rgj for adjustment of Kgp using the angle θ2 of the second arm. Further, a lower limit value of Rgj is Rgjmin. Furthermore, a gradient of Rgj relative to the angle θ2 of the second arm is defined by ±Kgj symmetrically with respect to θ2=0°. According to the adjustment method of Rgj based on FIG. 9, the angular velocity feedback gain Kgp relative to the angle θ2 may be adjusted by two kinds of parameters of the gradient Kgj and the lower limit value Rgjmin.

The angular velocity feedback gain Kgp is obtained by the following expression (1) for multiplication of a reference value Kgpb of Kgp by the coefficient Rgj obtained from FIG. 9.

$$Kgp = Rgj \times Kgpb \qquad (1)$$

As described above, around a posture of extension of the second arm 24 relative to the first arm 23 (θ2=0), the inertia about the shaft supporting part 32 formed by the first arm 23 and the second arm 24 is larger and the rigidity of the shaft supporting part 32 in the vertical directions relative to the base 21 is higher, and thus, the control system tends to be stabilized. In this case, the effect of reducing the vibration in the vertical directions may be enhanced by increase of Rgj.

On the other hand, in a posture of bending the second arm 24 relative to the first arm 23, the inertia formed by the first arm 23 and the second arm 24 decreases and the rigidity of the shaft supporting part 32 relative to the base 21 is lower, and thus, the control tends to be destabilized. In this case, stability of the control may be enhanced by decrease of Rgj.

The control section according to an embodiment of the present disclosure adjusts gain for feedback of output of the inertial sensor to control of the motor based on an angle of the second arm.

According to the embodiment, the feedback gain of the output of the inertial sensor is adjusted according to changes of the rigidity in the vertical directions in the shaft supporting part and the inertia about the shaft supporting part due to changes of the angle of the second arm, and thereby, destabilization of the control to suppress the vibration of the shaft supporting part in the vertical directions may be prevented.

Fifth Embodiment

The control apparatus 3 according to the fifth embodiment of the present disclosure adjusts angular velocity feedback gain Kgp based on the mass W of the work.

The control apparatus 3 of the robot system 1 described in FIG. 1 according to the embodiment has a function of improving the effect of reducing the vibration of the shaft supporting part 32 in the vertical directions and stabilizing control. Note that, in the following description, the embodiment will be explained with a focus on differences from the first embodiment to third embodiment and the explanation of the same items will be omitted.

In the robot system 1 according to the embodiment, as shown in FIGS. 3 to 7, the control section 3A has a Kgp adjustment unit 122 that changes the angular velocity feedback gain Kgp based on the mass W of the work. When the mass W of the work changes, magnitude of a reaction force acting on the shaft supporting part 32 by driving of the shaft 31 changes. Specifically, when the mass W of the work is larger, the reaction force by driving of the shaft 31 increases and the same effect as that by increase of the angular velocity feedback gain Kgp is obtained. Accordingly, if the angular velocity feedback gain Kgp is fixed regardless of the mass W of the work, the control may be destabilized and the damping effect may be insufficient. The control apparatus 3 of the embodiment is configured to adjust the angular velocity feedback gain Kgp according to the mass W of the work and solves the above described problem.

Figure 10:
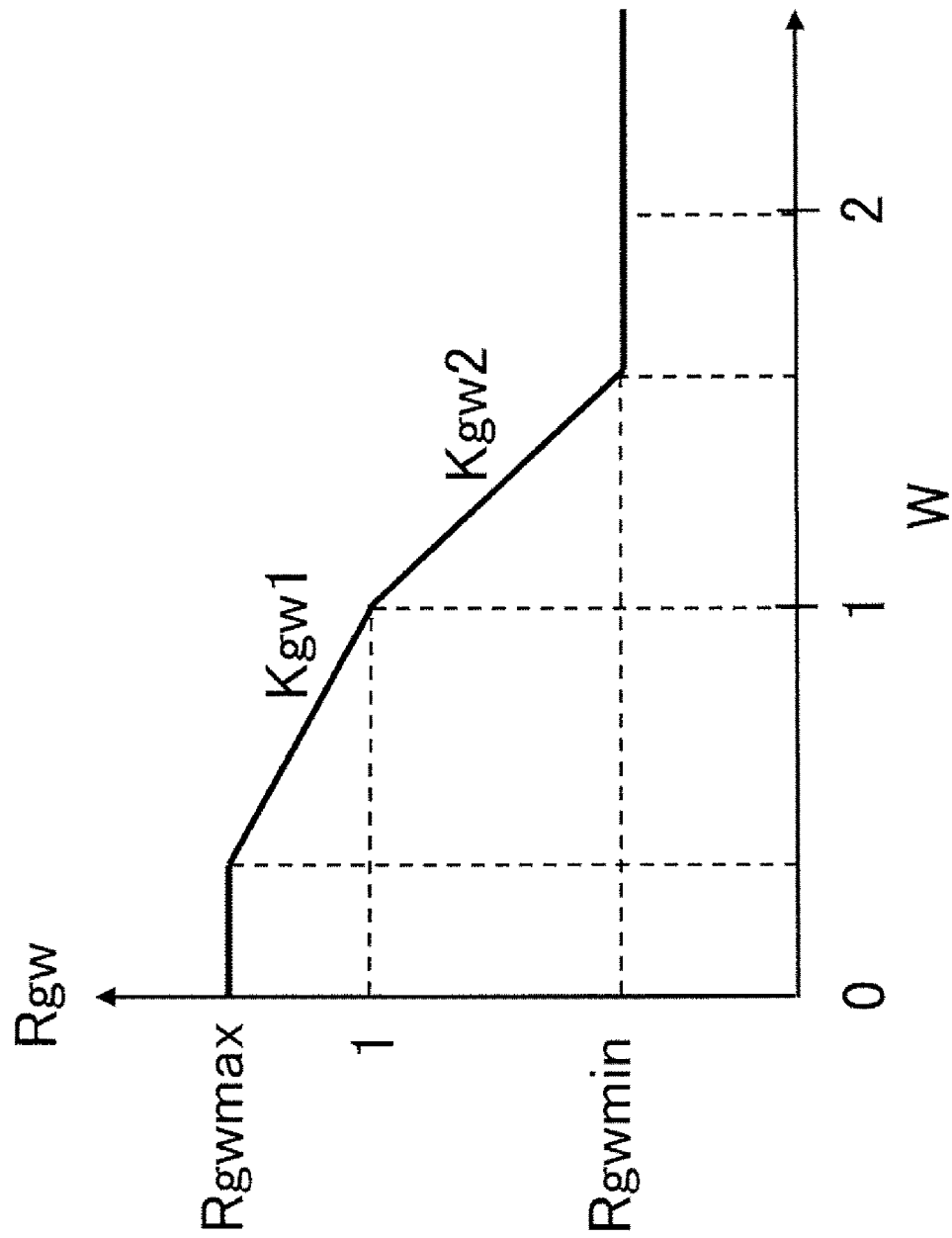
FIG. 10 is a graph showing a relationship between a mass W of a work and a coefficient Rgw according to a fifth embodiment.

As an example of the control method, FIG. 10 shows a graph of a relationship between the normalized mass W of the work and a coefficient Rgw. The vertical axis of the graph in FIG. 10 indicates the coefficient Rgw for adjustment of Kgp using the mass W of the work. Further, a lower limit value of Rgw is Rgwmin and an upper limit value of Rgw is Rgwmax. The horizontal axis of the graph indicates the normalized mass W of the work. Furthermore, a gradient of the graph when the mass W of the work is smaller than one is defined by Kgw1 and a gradient of the graph when the mass W of the work is larger than one is defined by Kgw2. According to the adjustment method of Rgw based on FIG. 10, the angular velocity feedback gain Kgp relative to the mass W of the work may be adjusted by four kinds of parameters of the gradients Kgw1, Kgw2, Rgwmax, and Rgwmin.

As described above, in the robot system 1, as the mass W of the work is larger, the reaction force for driving the shaft 31 increases and the same effect as that by increase of the angular velocity feedback gain Kgp is obtained. Thus, as shown in FIG. 10, in a region in which the mass W of the work is larger than one, Rgw is decreased at the gradient Kgw2 and the stability of control may be kept steady. In a region in which the mass W of the work is smaller than one, Rgw is increased at the gradient Kgw1 and the damping effect may be enhanced.

The angular velocity feedback gain Kgp is obtained by the following expression (2) for multiplication of the reference value Kgpb of Kgp by the coefficient Rgw obtained from FIG. 10.

$$Kgp = Rgw \times Kgpb \quad (2)$$

As described above, in the robot system 1, as the mass W of the work is larger, the reaction force increases and the control tends to be destabilized. In this case, as shown in FIG. 10, stability of the control may be enhanced by decrease of Rgw.

As described above, the control section according to an embodiment of the present disclosure adjusts gain for feedback of output of the inertial sensor to control of the motor based on a mass of a work added to the shaft.

According to the embodiment, the feedback gain of the output of the inertial sensor is adjusted according to changes of the mass W of the work, and thereby, destabilization of the control to suppress the vibration of the shaft supporting part in the vertical directions may be prevented.

Sixth Embodiment

The control apparatus 3 according to the sixth embodiment of the present disclosure adjusts angular velocity feedback gain Kgp based on the position Z of the shaft.

The control apparatus 3 of the robot system 1 described in FIG. 1 according to the embodiment has a function of improving the effect of reducing the vibration of the shaft supporting part 32 in the vertical directions and stabilizing control. Note that, in the following description, the embodiment will be explained with a focus on differences from the first embodiment to third embodiment and the explanation of the same items will be omitted.

In the robot system 1 according to the embodiment, as shown in FIGS. 3 to 7, the control section 3A has a Kgp adjustment unit 122 that changes the angular velocity feedback gain Kgp based on the shaft position Z. When the shaft position Z changes, a resonance frequency of the shaft 31 in a bending mode changes. Specifically, when the shaft 31 is lowered, the resonance frequency of the shaft 31 in the bending mode may be lower and the control may interfere with control to reduce the vibration in the vertical directions and be destabilized. The control apparatus 3 of the embodiment is configured to change the angular velocity feedback gain Kgp according to the shaft position Z and solves the above described problem.

Figure 11:
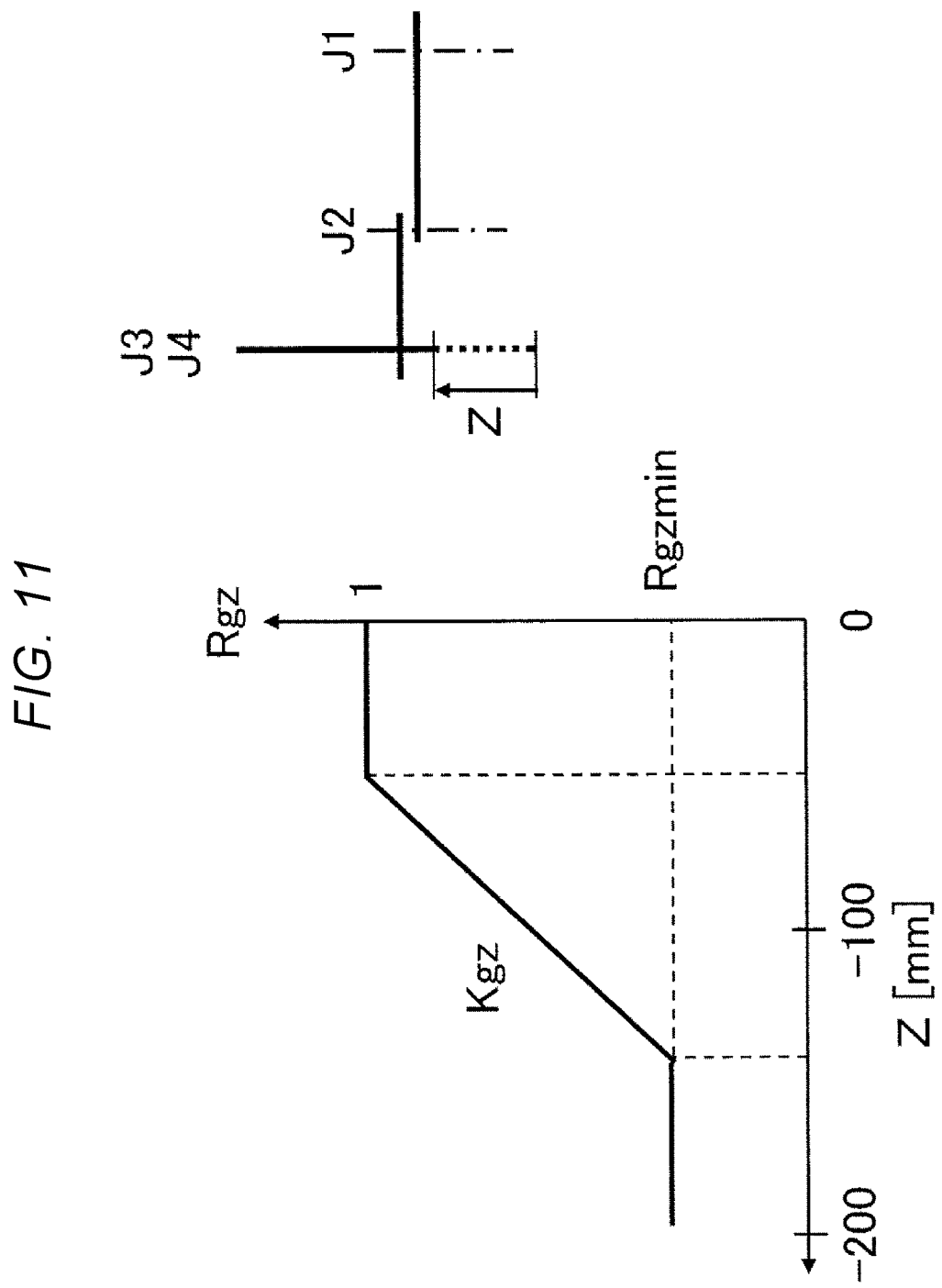
FIG. 11 is a graph showing a relationship between a shaft position Z and a coefficient Rgz according to a sixth embodiment.

As an example of the control method, FIG. 11 shows a graph of a relationship between the shaft position Z and a coefficient Rgz. The vertical axis of the graph in FIG. 11 indicates the coefficient Rgz, and the maximum value is one and the minimum value is Rgzmin. The horizontal axis indicates the shaft position Z. Further, a gradient of the coefficient Rgz relative to the Z position is indicated by Kgz. According to the adjustment method of Rgz based on FIG. 11, the angular velocity feedback gain Kgp relative to the shaft position Z may be adjusted by two kinds of parameters of the minimum value Rgzmin and the coefficient Rgz.

The angular velocity feedback gain Kgp is obtained by the following expression (3) for multiplication of the reference value Kgpb of Kgp by the coefficient Rgz obtained from FIG. 11.

$$Kgp = Rgz \times Kgpb \quad (3)$$

As described above, in the robot system 1, as the shaft position Z is lower, the resonance frequency of the shaft in the bending mode is lower and the control tends to be destabilized. In this case, as shown in FIG. 11, stability of the control may be enhanced by decrease of Rgz.

As described above, the control section according to an embodiment of the present disclosure adjusts gain for feedback of output of the inertial sensor to control of the motor based on a position of the linear motion.

According to the embodiment, the feedback gain of the output of the inertial sensor is adjusted according to the position of the linear motion of the shaft, and thereby, destabilization of the control to suppress the vibration of the shaft supporting part in the vertical directions may be prevented.

Seventh Embodiment

The control apparatus 3 according to the seventh embodiment of the present disclosure adjusts an LPF cutoff frequency Flpf based on the angle θ2 of the second arm 24.

The control apparatus 3 of the robot system 1 described in FIG. 1 according to the embodiment has a function of improving the effect of reducing the vibration of the shaft supporting part 32 in the vertical directions and stabilizing control. Note that, in the following description, the embodiment will be explained with a focus on differences from the first embodiment to third embodiment and the explanation of the same items will be omitted.

In the robot system 1 according to the embodiment, as shown in FIGS. 3 to 7, the control section 3A has an Flpf adjustment unit 121 that changes an LPF cutoff frequency Flpf based on the angle θ2 of the second arm 24 relative to the first arm 23. When the angle θ2 changes, rigidity of the shaft supporting part 32 in the vertical directions relative to the base 21 and inertia about the shaft supporting part 32 in a combination of the first arm 23 and the second arm 24 change. Specifically, when the second arm bends and the angle θ2 increases, the rigidity becomes lower and the inertia decreases. Accordingly, if the LPF cutoff frequency Flpf is fixed regardless of the angle θ2, the control may be destabilized and the damping effect may be insufficient. The control apparatus 3 of the embodiment is configured to adjust the LPF cutoff frequency Flpf according to the angle θ2 and solves the above described problem.

Figure 12:
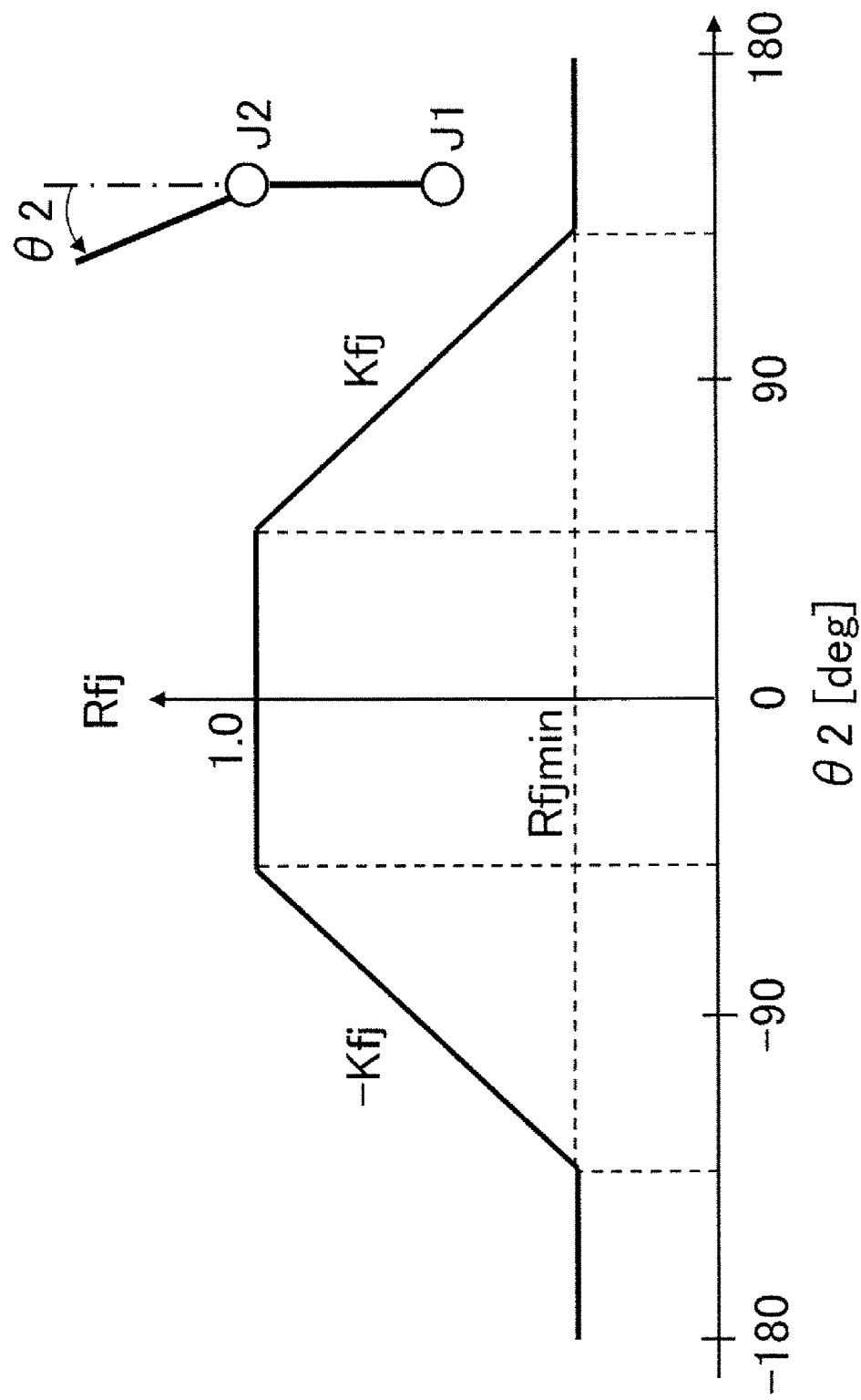
FIG. 12 is a graph showing a relationship between the angle θ2 of the second arm and a coefficient Rfj according to a seventh embodiment.

As an example of the control method, FIG. 12 shows a graph of a relationship between the angle θ2 of the second arm and a coefficient Rfj. The vertical axis of the graph in FIG. 12 indicates the coefficient Rfj for adjustment of Flpf using θ2. Further, a lower limit value of Rfj is Rfjmin. Furthermore, a gradient of Rfj relative to the angle θ2 of the second arm is defined by ±Kfj symmetrically with respect to θ2=0°. According to the adjustment method of Rfj based on FIG. 12, the LPF cutoff frequency Flpf relative to the angle θ2 may be adjusted by two kinds of parameters of the gradient Kfj and the lower limit value Rfjmin.

The LPF cutoff frequency Flpf is obtained by the following expression (4) for multiplication of a reference value Flpfb of Flpf by the coefficient Rfj obtained from FIG. 12.

$$Flpf = Rfj \times Flpfb \quad (4)$$

As described above, around a posture of extension of the second arm 24 relative to the first arm 23 (θ2=0), the inertia about the shaft supporting part 32 formed by the first arm 23 and the second arm 24 is larger and the rigidity of the shaft supporting part 32 in the vertical directions relative to the base 21 is higher, and thus, the control system tends to be stabilized. In this case, the effect of reducing the vibration in the vertical directions may be enhanced by increase of Flpf.

On the other hand, in a posture of bending the second arm 24 relative to the first arm 23, the inertia formed by the first arm 23 and the second arm 24 decreases and the rigidity of the shaft supporting part 32 relative to the base 21 is lower, and thus, the control tends to be destabilized. In this case, stability of the control may be enhanced by decrease of Flpf.

As described above, the control section according to an embodiment of the present disclosure adjusts a cutoff frequency of the lowpass filter based on an angle of the second arm.

According to the embodiment, the cutoff frequency of the lowpass filter is adjusted according to the angle of the second arm, and thereby, destabilization of the control to suppress the vibration of the shaft supporting part in the vertical directions may be prevented.

Eighth Embodiment

Figure 13:
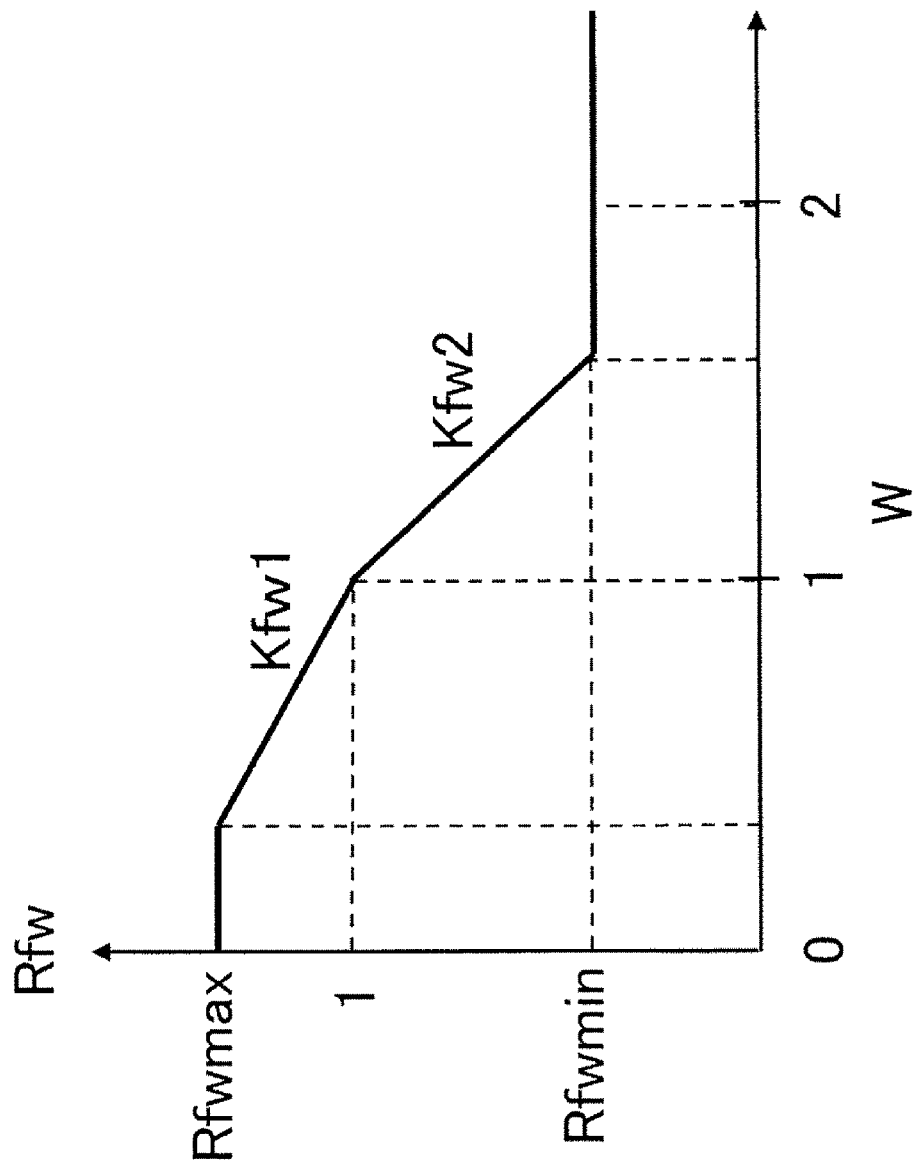
FIG. 13 is a graph showing a relationship between the mass W of the work and a coefficient Rfw according to an eighth embodiment.

In FIG. 13, the control apparatus 3 according to the eighth embodiment of the present disclosure adjusts the LPF cutoff frequency Flpf based on the mass W of the work.

The control apparatus 3 of the robot system 1 described in FIG. 1 according to the embodiment has a function of improving the effect of reducing the vibration of the shaft supporting part 32 in the vertical directions and stabilizing control. Note that, in the following description, the embodiment will be explained with a focus on differences from the first embodiment to third embodiment and the explanation of the same items will be omitted.

In the robot system 1 according to the embodiment, as shown in FIGS. 3 to 7, the control section 3A has an Flpf adjustment unit 121 that changes the LPF cutoff frequency Flpf based on the mass W of the work. When the mass W of the work changes, the resonance frequency of the shaft 31 in the bending mode may change and interfere with control to reduce the vibration of the shaft supporting part 32 in the vertical directions. Accordingly, if the LPF cutoff frequency Flpf is fixed regardless of the mass W of the work, the control may be destabilized and the damping effect may be insufficient. The control apparatus 3 of the embodiment is configured to adjust the LPF cutoff frequency Flpf according to the mass W of the work and solves the above described problem.

As an example of the control method, FIG. 13 shows a graph of a relationship between the normalized mass W of the work and the coefficient Rfw. The vertical axis of the graph in FIG. 13 indicates the coefficient Rfw for adjustment of Flpf using the mass W of the work. Further, a lower limit value of Rfw is Rfwmin and an upper limit value of Rfw is Rfwmax. The horizontal axis of the graph indicates the mass W of the work. Furthermore, a gradient of the graph when the mass W of the work is smaller than one is defined by Kfw1 and a gradient of the graph when the mass W of the work is larger than one is defined by Kfw2. According to the adjustment method of Rfw based on FIG. 13, the LPF cutoff frequency Flpf relative to the mass W of the work may be adjusted by four kinds of parameters of the gradients Kfw1, Kfw2, Rfwmax, and Rfwmin.

As described above, in the robot system 1, as the mass W of the work is larger, the resonance frequency of the shaft 31 in the bending mode is lower and the control may interfere with control to reduce the vibration in the vertical directions and be destabilized. Thus, as shown in FIG. 13, in a region in which the mass W of the work is larger than one, Rfw is decreased at Kfw2 and the stability of control may be kept steady. In a region in which the mass W of the work is smaller than one, Rfw is increased at the gradient Kfw1 and the damping effect may be enhanced.

The LPF cutoff frequency Flpf is obtained by the following expression (5) for multiplication of the reference value Flpfb of Flpf by the coefficient Rfw obtained from FIG. 13.

$$Flpf = Rfw \times Flpfb \quad (5)$$

As described above, as the mass W of the work is larger, the resonance frequency of the shaft 31 in the bending mode is lower and the control to reduce the vibration in the vertical directions may be destabilized. In this case, the control may be stabilized by decrease of Flpf.

As described above, the control section according to an embodiment of the present disclosure adjusts a cutoff frequency of the lowpass filter based on a mass of a work added to the shaft.

According to the embodiment, the cutoff frequency of the lowpass filter is adjusted according to the mass of the work, and thereby, destabilization of the control to suppress the vibration of the shaft supporting part in the vertical directions may be prevented.

Ninth Embodiment

The control apparatus 3 according to the ninth embodiment of the present disclosure adjusts the LPF cutoff frequency Flpf based on the position Z of the shaft.

The control apparatus 3 of the robot system 1 described in FIG. 1 according to the embodiment has a function of improving the effect of reducing the vibration of the shaft supporting part 32 in the vertical directions and stabilizing control. Note that, in the following description, the embodiment will be explained with a focus on differences from the first embodiment to third embodiment and the explanation of the same items will be omitted.

In the robot system 1 according to the embodiment, as shown in FIGS. 3 to 7, the control section 3A has an Flpf adjustment unit 121 that changes the LPF cutoff frequency Flpf based on the shaft position Z. When the shaft position Z changes, the resonance frequency of the shaft 31 in the bending mode changes. Specifically, when the shaft 31 is lowered, the resonance frequency in the bending mode is lower and the control may interfere with control to reduce the vibration in the vertical directions and be destabilized. The control apparatus 3 of the embodiment is configured to change the LPF cutoff frequency Flpf according to the shaft position Z and solves the above described problem.

Figure 14:
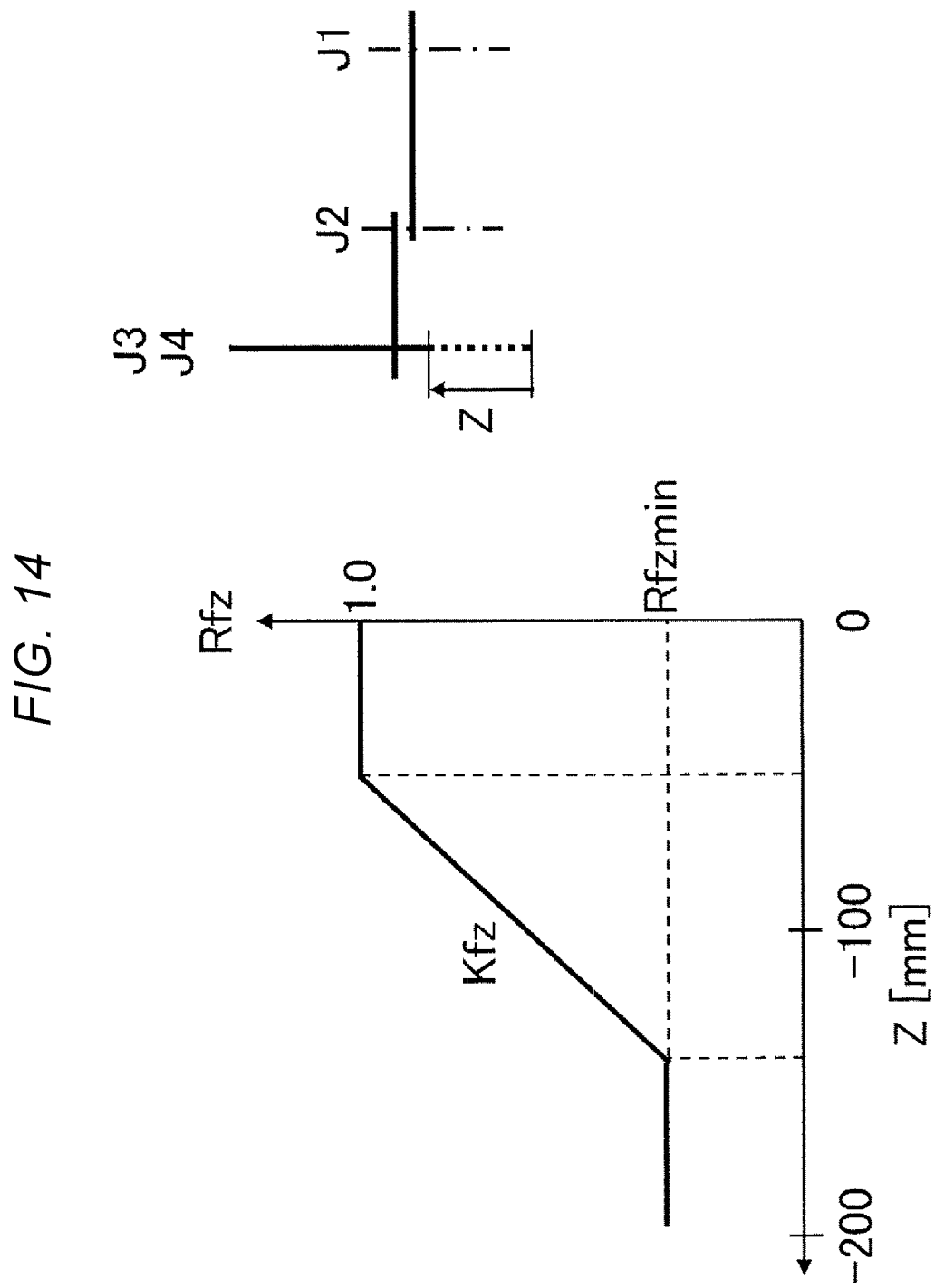
FIG. 14 is a graph showing a relationship between the shaft position Z and a coefficient Rfz according to a ninth embodiment.

As an example of the control method, FIG. 14 shows a graph of a relationship between the shaft position Z and the coefficient Rfz for adjustment of Flpf using the shaft position Z. The vertical axis of the graph in FIG. 14 indicates the coefficient Rfz, and the maximum value is one and the minimum value is Rfzmin. The horizontal axis indicates the shaft position Z. Further, a gradient of the coefficient Rfz relative to the Z position is indicated by Kfz. According to the adjustment method of Rfz based on FIG. 14, the LPF cutoff frequency Flpf relative to the shaft position Z may be adjusted by two kinds of parameters of the minimum value Rfzmin and the gradient Kfz.

The LPF cutoff frequency Flpf is obtained by the following expression (6) for multiplication of the reference value Flpfb of Flpf by the coefficient Rfz obtained from FIG. 14.

$$Flpf = Rfz \times Flpfb \quad (6)$$

As described above, in the robot system 1, as the shaft position Z is lower, the resonance frequency of the shaft in the bending mode is lower and the control tends to be destabilized. In this case, as shown in FIG. 14, stability of the control may be made higher by decrease of Rfz.

As described above, the control section according to an embodiment of the present disclosure adjusts the cutoff frequency of the lowpass filter based on a position of the linear motion.

According to the embodiment, the cutoff frequency of the lowpass filter is adjusted according to the position of the linear motion, and thereby, destabilization of the control to suppress the vibration of the shaft supporting part in the vertical directions may be prevented.

What is claimed is:

1. A robot system comprising:
   a horizontal articulated robot, the horizontal articulated robot being configured with:
   a base;
   a first arm provided at the base and pivoting around a first axis relative to the base;
   a second arm provided at the first arm and pivoting around a second axis relative to the first arm;
   a shaft provided in the second arm and linearly moving in directions along a third axis;
   a motor that drives linear motion of the shaft;
   a position detector that detects a rotational position of the motor at a current time; and
   an inertial sensor provided in the second arm, the inertial sensor being configured to detect an angular velocity of the second arm and output a sensor signal corresponding to the detected angular velocity; and
   a processor configured to control the motor, the position detector, and the inertial sensor of the horizontal articulated robot so as to:
   receive the sensor signal from the inertial sensor after detecting the angular velocity of the second arm;
   calculate a vibration value of the shaft along the third axis based on the sensor signal;
   generate a position command at a predetermined interval, the position command relating to the rotational position of the motor;
   obtain the rotational position of the motor at the current time;
   generate a velocity command for coinciding the rotational position with the position command based on the calculated vibration value;
   generate a current command corresponding to the velocity command, the current command being a first current to be applied to the motor; and
   apply the first current to the motor,
   wherein the inertial sensor is configured to detect the angular velocity about an angular velocity detection axis, and the angular velocity detection axis is orthogonal to a plane containing the second axis and the third axis.

2. The robot system according to claim 1, wherein the processor is further configured to use the sensor signal of the inertial sensor to generate the current command.

3. The robot system according to claim 1, wherein the processor is further configured to use the sensor signal of the inertial sensor to perform proportional control and generate the current command.

4. The robot system according to claim 1, wherein the processor is further configured to use the sensor signal of the inertial sensor to generate the velocity command.

5. The robot system according to claim 1, wherein the processor is further configured to remove noise contained in the sensor signal of the inertial sensor using a lowpass filter.

6. The robot system according to claim 5, wherein the lowpass filter has a cutoff frequency from 20 Hz to 200 Hz.

7. The robot system according to claim 5, wherein the processor is further configured to adjust a cutoff frequency of the lowpass filter based on an angle of the second arm.

8. The robot system according to claim 5, wherein the processor is further configured to adjust a cutoff frequency of the lowpass filter based on a mass of a work added to the shaft.

9. The robot system according to claim 5, wherein the processor is further configured to adjust a cutoff frequency of the lowpass filter based on a position of the linear motion of the shaft.

10. The robot system according to claim 5, wherein the inertial sensor is an angular velocity sensor.

11. The robot system according to claim 1, wherein the processor is further configured to remove detuning noise contained in the sensor signal of the inertial sensor using a band elimination filter.

12. The robot system according to claim 1, wherein the processor is further configured to obtain an offset component contained in the sensor signal of the inertial sensor by moving average and remove the offset component from the sensor signal of the inertial sensor.

13. The robot system according to claim 1, wherein the processor is further configured to remove an offset component contained in the sensor signal of the inertial sensor using a highpass filter.

14. The robot system according to claim 1, wherein the processor is further configured to adjust gain for feedback of the sensor signal of the inertial sensor to control of the motor based on an angle of the second arm.

15. The robot system according to claim 1, wherein the processor is further configured to adjust gain for feedback of the sensor signal of the inertial sensor to control of the motor based on a mass of a work added to the shaft.

16. The robot system according to claim 1, wherein the processor is further configured to adjust gain for feedback of the sensor signal of the inertial sensor to control of the motor based on a position of the linear motion of the shaft.

* * * * *